US012605299B2

(12) United States Patent
Lewis

(10) Patent No.: US 12,605,299 B2
(45) Date of Patent: Apr. 21, 2026

(54) ASSISTED WALKING DEVICE

(71) Applicant: Freedom to Roam, LLC, Windsor Heights, IA (US)

(72) Inventor: Robert John Lewis, Windsor Heights, IA (US)

(73) Assignee: Freedom to Roam, LLC, Windsor Heights, IA (US)

( * ) Notice: Subject to any disclaimer, the term of this patent is extended or adjusted under 35 U.S.C. 154(b) by 1149 days.

(21) Appl. No.: 17/646,384

(22) Filed: Dec. 29, 2021

(65) Prior Publication Data

US 2022/0202642 A1 Jun. 30, 2022

Related U.S. Application Data

(60) Provisional application No. 63/199,475, filed on Dec. 31, 2020.

(51) Int. Cl.
*A61H 3/04* (2006.01)

(52) U.S. Cl.
CPC ......... *A61H 3/04* (2013.01); *A61H 2003/046* (2013.01); *A61H 2201/0157* (2013.01); *A61H 2201/0161* (2013.01); *A61H 2201/0192* (2013.01); *A61H 2201/1253* (2013.01); *A61H 2201/1621* (2013.01); *A61H 2201/1635* (2013.01); *A61H 2201/1673* (2013.01)

(58) Field of Classification Search
CPC ................................................ A61H 2003/046
See application file for complete search history.

(56) References Cited

U.S. PATENT DOCUMENTS 4,907,794 A * 3/1990 Rose ........................ A61H 3/04 280/43.24
5,020,560 A * 6/1991 Turbeville ............... A61H 3/04 280/282
5,152,730 A 10/1992 Hoffman
5,172,715 A * 12/1992 Webb ....................... A61H 3/04 482/68
5,224,717 A * 7/1993 Lowen ..................... A61H 3/04 135/73
5,224,731 A * 7/1993 Johnson ................... A61G 5/00 280/87.021
5,275,426 A * 1/1994 Tankersley ............. A61H 3/008 280/87.051
5,476,432 A * 12/1995 Dickens ................... A61H 3/04 482/67

(Continued)

*Primary Examiner* — Jeffrey J Restifo
(74) *Attorney, Agent, or Firm* — McKee, Voorhees & Sease, PLC

(57) ABSTRACT

A stable walking apparatus can be used to allow the elderly, disabled, injured, or infirmed to move for day-to-day activities and exercise. The apparatus supports the individual at an upper body portion, such as under the arms of the user. This allows use of the arms and legs of the individual, such as better balance and move with the device, while also controlling aspects of the device. The support is height adjustable, and also includes a braking system to both slow down and stop the user-apparatus. The braking system can be used with limited extremity functionality for greater use of the apparatus by a wide range of individuals. Swiveling wheels provide for additional functionality to use the device for more purposes and in increased locations.

19 Claims, 21 Drawing Sheets

(56) References Cited

U.S. PATENT DOCUMENTS 5,526,893 A * 6/1996 Higer ........ A61H 3/04 482/68
5,538,268 A * 7/1996 Miller ........ A61H 3/04 482/68
5,954,161 A * 9/1999 Lee ........ B62L 3/02 74/489
6,003,532 A * 12/1999 Pi ........ A61H 3/04 135/84
6,578,594 B1 * 6/2003 Bowen ........ A61H 3/008 482/69
6,619,681 B2 9/2003 Gutierrez
6,733,018 B2 * 5/2004 Razon ........ A61H 3/04 280/87.021
7,021,324 B1 * 4/2006 Clay ........ A61H 3/04 135/66
7,275,554 B2 * 10/2007 Mullholand ........ A61H 3/008 135/67
7,559,560 B2 * 7/2009 Li ........ A61H 3/04 16/35 R
7,735,499 B1 * 6/2010 Pennise ........ A61H 3/04 280/87.051
8,998,223 B2 * 4/2015 Chang ........ B60T 7/102 280/87.021
9,585,807 B2 * 3/2017 Fellingham ........ A61H 3/04
9,744,094 B2 * 8/2017 Liu ........ A61H 3/04
10,391,018 B1 * 8/2019 Fitzwater ........ A61H 1/00
10,583,066 B1 * 3/2020 Abroms ........ A61H 1/00
10,617,592 B2 * 4/2020 Fellingham ........ A61H 3/04
11,071,676 B2 * 7/2021 Fellingham ........ A61H 3/04
11,179,289 B2 * 11/2021 Miller ........ A61H 3/04
11,793,705 B2 * 10/2023 Diao ........ B60T 7/12
11,850,207 B1 * 12/2023 Rasmussen ........ A61H 3/04
11,974,959 B1 * 5/2024 Chen ........ A61H 3/04
12,090,115 B2 * 9/2024 Liu ........ A61G 5/101
2005/0183759 A1 * 8/2005 Wolfe ........ A61H 3/04 135/67
2009/0050187 A1 * 2/2009 Lamb ........ A61H 3/04 135/67
2010/0170546 A1 * 7/2010 Popovic ........ A61H 3/008 135/67
2017/0065479 A1 * 3/2017 Fellingham ........ A61H 3/04
2017/0258664 A1 * 9/2017 Purcell ........ A61H 3/04
2018/0168909 A1 6/2018 Karlovich
2022/0151860 A1 * 5/2022 Shugert ........ A63B 23/03541
2022/0202642 A1 * 6/2022 Lewis ........ A61H 3/008
2023/0149246 A1 * 5/2023 Yin ........ A61H 3/068 135/66
2023/0190567 A1 * 6/2023 Hill-Williams ........ A61G 5/122 280/282
2024/0398644 A1 * 12/2024 Lin ........ A61G 5/0875

* cited by examiner

ASSISTED WALKING DEVICE

CROSS REFERENCE TO RELATED APPLICATIONS

This application claims priority under 35 U.S.C. § 119 to provisional patent application U.S. Ser. No. 63/199,475, filed Dec. 31, 2020. The provisional patent application is herein incorporated by reference in its entirety, including without limitation, the specification, claims, and abstract, as well as any figures, tables, appendices, or drawings thereof.

FIELD OF THE INVENTION

The invention relates generally to an apparatus and corresponding method of use mobility devices to aid persons in varying states of disability in walking and other movement. More particularly, but not exclusively, the invention relates to device to better control the assisted walking of an individual in a safe and hands-free manner.

BACKGROUND OF THE INVENTION

There are many devices intended to aid in increasing the mobility or movability of a person having limited functionality, such as an elderly person, disabled person, amputee, or a person with another illness that may affect their movement. The devices could be walkers or other stability devices to aid in the movement of the individual. Such devices may include seats, wheels, arm supports, harnesses, or other support members to carry at least some of the weight of the user, which allows the user to focus on moving with greater confidence to avoid injuries. This would allow a user to exercise or even have greater independence in their daily lives.

However, there are still limitations with many of the walkers or other stability devices. For example, many of the devices require at least some use of arms, hands, or some combination thereof. This can be limiting to the people having limited use of their upper extremities and require the aid of another person or persons to aid in use of the device. In addition, when additional devices (e.g., crutches) are required in addition to the mobility device, this creates additional issues for a user of the devices.

Still further, many of the devices do not include any sort of speed control. For example, to move the devices, a user generally must use their own power or the power of an aid to move the device. This can be in the form of the user's legs to move the device, arms to move the wheels or power the device, or the aid from another person to push or otherwise urge movement of the user/device combination. Thus, the movement will only be as much as the user and/or the separate aid. In addition, there can be issues with braking in slowing down or stopping the devices. This can be especially cumbersome when the user has limited ability of multiple extremities that would otherwise be used to control the speed of the mobility device. Situations could arise when the uncontrolled movement of the user and device combination could cause injuries, damage, or other problems due to the limited control.

Additional limitations may include the inability to properly adjust the height of a device to properly support the user. The supports may not be enough to allow a user to use the devices without aid of another person or persons.

Therefore, there exists a need for a device that can be used in a hands-free manner by individuals having limited mobility that provides for greater control of the user and also includes speed controls in the form of braking that can be operated by users with limited mobility.

SUMMARY OF THE INVENTION

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage to improve on or overcome the deficiencies in the art.

It is a further object, feature, and/or advantage to provide a stability device that includes arm supports to allow a user to use the device for walking or other upright exercise activities It is still yet a further object, feature, and/or advantage to provide a stability device that is height adjustable to be used by many people of different heights, while still providing the necessary support for the individual.

It is yet another object, feature, and/or advantage to include wheels for a stability device that provide a large range of motion for the user.

It is still a further object, feature, and/or advantage to include a braking system that can be used with limited extremity motion of the user. The braking system can be used to both slow down and/or stop the device.

The apparatus disclosed herein can be used in a wide variety of applications. For example, the apparatus could be used to provide support for elderly, disabled, or otherwise limited individuals to provide a secure device for exercise, movement, or even normal movement without the need for another person.

According to at least some aspects, the invention can be used with the aid of additional supports, such as crutches, canes, walkers, or the like. However, it should be noted that the device can be used without such aids.

According to at least some aspects, the invention can be sized to fit through most common doorways and can be used to travel up and down ramps and used on a variety of surfaces.

It is preferred the apparatus be safe, cost effective, and durable. For example, the apparatus can include comfort members for supporting and contacting the user, while also being stable and being able to support users of various sizes and abilities.

At least one embodiment disclosed herein comprises a distinct aesthetic appearance. Ornamental aspects included in such an embodiment can help capture a consumer's attention and/or identify a source of origin of a product being sold. Said ornamental aspects will not impede functionality of the present invention.

According to some aspects of the present disclosure, a walking device includes a height adjustable frame, an upper body support at an upper end of the frame for retaining an upper body of a user, a plurality of wheels at the lower end of the frame, at least one of the plurality of wheels rotatably connected to the frame to allow swiveling thereof, and a hands-free braking system connected to the frame and the plurality of wheels, the hands-free braking system capable of slowing down and/or stopping the movement of one or more of the plurality of wheels.

According to at least some aspects and/or embodiments, the hands-free braking system positioned at an upper end of the frame and at least partially below the upper body support.

According to at least some aspects and/or embodiments, the braking system comprises one or more paddles rotatably connected to the frame.

According to at least some aspects and/or embodiments, the one or more paddles are connected to one or more of the plurality of wheels with a cable, and wherein activation of the cable applies a brake to the one or more of the plurality of wheels.

According to at least some aspects and/or embodiments, the one or more paddles are rotatable to activate the cable.

According to at least some aspects and/or embodiments, the one or more paddles include a rotatable axis generally in line with the direction of travel such that the paddles rotate generally perpendicular to the direction of travel.

According to at least some aspects and/or embodiments, the support comprises a pliable member extending approximately 270-degrees around the frame.

According to at least some aspects and/or embodiments, the support comprises a security member to aid in securing a user to the device.

According to at least some aspects and/or embodiments, the plurality of wheels comprises two front wheels and two rear wheels.

According to at least some aspects and/or embodiments, the two rear wheels are rotatable with respect to the frame approximately 30-60 degrees.

According to additional aspects of the invention, an assisted walking device includes a frame, a support at an upper end of the frame for supporting and securing a user to the device, said support comprising a comfort member and a securing device, a plurality of wheels at a lower end of the frame, and a braking system comprising one or more paddles connected to one or more of the plurality of wheels via a cable, wherein movement of the one or more paddles activates the cable to apply friction to the one or wheels.

According to at least some aspects and/or embodiments, the one or more paddles are positioned at an upper portion of the frame.

According to at least some aspects and/or embodiments, the movement of the one or more paddles comprises a rotational movement related to a portion of the frame.

According to at least some aspects and/or embodiments, the frame is height adjustable.

According to at least some aspects and/or embodiments, at least one of the plurality of wheels is rotatable in a swiveling motion.

According to at least some aspects and/or embodiments, the braking system activated in a hands-free manner.

According to yet additional aspects of the invention, a walking device comprises a height adjustable frame having a comfort member at an upper portion to engage an upper extremity of a user, a set of front wheels at a lower, front portion of the frame, a set of rear wheels at a lower, rear portion of the frame, the set of rear wheels rotatable about a generally vertical axis to allow swiveling movement of the wheels relative to the frame, and a hands-free braking system operatively connected to the set of rear wheels, said hands free braking system comprising a hands-free activation.

According to at least some aspects and/or embodiments, the braking system comprises one or more paddles at an upper portion of the frame and engageable with one or more upper extremities of the user.

According to at least some aspects and/or embodiments, the one or more paddles connected to the set of rear wheels via a cable to active a friction element in contact with the set of rear wheels to slow down and stop the wheels when activated.

According to at least some aspects and/or embodiments, the walking device further includes a securing device adjacent the comfort member to secure a user to the frame.

These and/or other objects, features, advantages, aspects, and/or embodiments will become apparent to those skilled in the art after reviewing the following brief and detailed descriptions of the drawings. Furthermore, it should be appreciated that any of the aspects and/or embodiments could be combined with any of the other aspects and/or embodiments to arrive at new embodiments not specifically disclosed, but which would be understood and apparent from a reading of the present disclosure.

BRIEF DESCRIPTION OF THE DRAWINGS

Several embodiments in which the invention can be practiced are illustrated and described in detail, wherein like reference characters represent like components throughout the several views. The drawings are presented for exemplary purposes and may not be to scale unless otherwise indicated.

Figure 1:
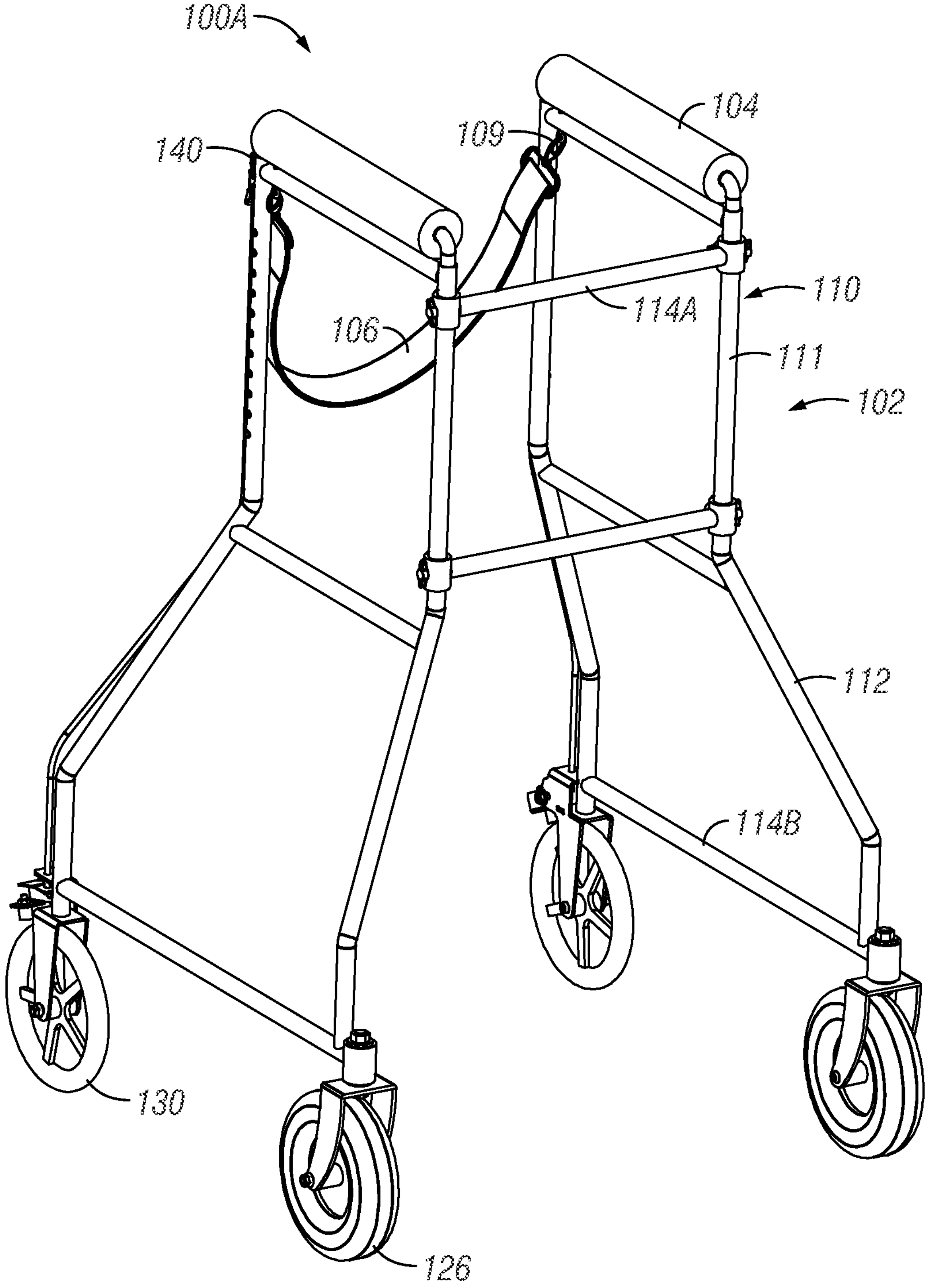
FIG. 1 is an isometric view of a walking device according to aspects and/or embodiments disclosed in the specification.

An artisan of ordinary skill need not view, within isolated figure(s), the near infinite number of distinct permutations of features described in the following detailed description to facilitate an understanding of the invention.

DETAILED DESCRIPTION OF THE INVENTION

The present disclosure is not to be limited to that described herein. Mechanical, electrical, chemical, procedural, and/or other changes can be made without departing from the spirit and scope of the invention. No features shown or described are essential to permit basic operation of the invention unless otherwise indicated.

Unless defined otherwise, all technical and scientific terms used above have the same meaning as commonly understood by one of ordinary skill in the art to which embodiments of the invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described in the specification and the claims.

The term "about" as used herein refer to slight variations in numerical quantities with respect to any quantifiable variable. Inadvertent error can occur, for example, through use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

The "scope" of the invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

The present disclosure is directed towards walking devices, which include, but is not limited to assisted walking apparatus/devices, walking mobility aids, exercise aids, mobility aids/devices, walking support, or other term used to describe a device to aid/allow a user in their mobility. While the term "walking" is used herein, it should be appreciated that the device is not to be limited to just walking and can be used to aid in generally any and all mobility for a user, who may otherwise have at least some difficulties in their own mobility. For example, disabled persons, elderly, infirm, sick, injured, or like users could benefit from the use of the walking device as disclosed herein. Still further, these should not be limiting to the users, as anyone could use the device as an aid in mobility.

As will be understood, devices disclosed herein could be used for basic mobility, exercise, day-to-day activities/movement, rehabilitation, physical therapy, or generally any other reason, and the device should not be limited to any specific or particular usage.

Figure 2:
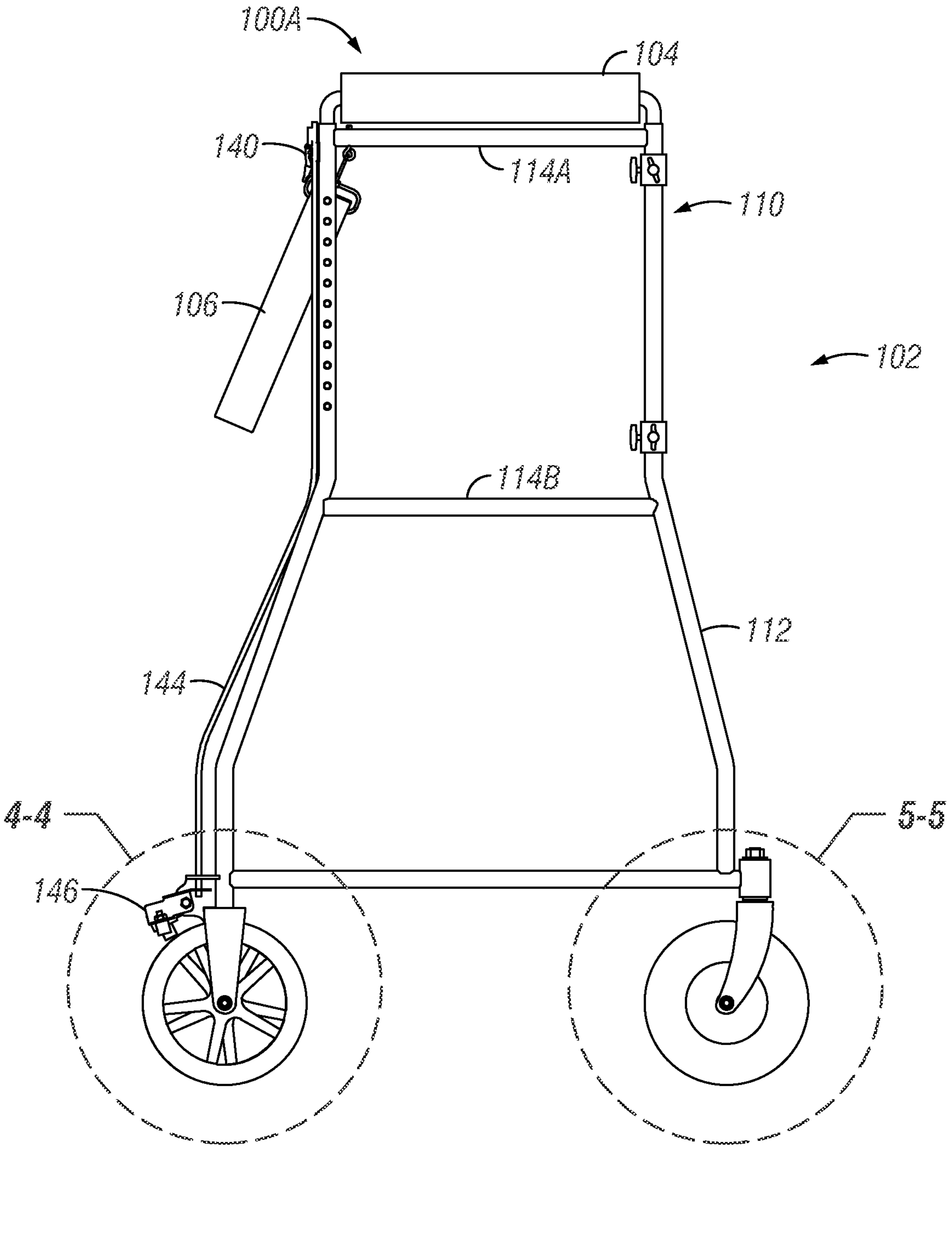
FIG. 2 is a side elevation view of the walking device of FIG. 1.
Figure 3:
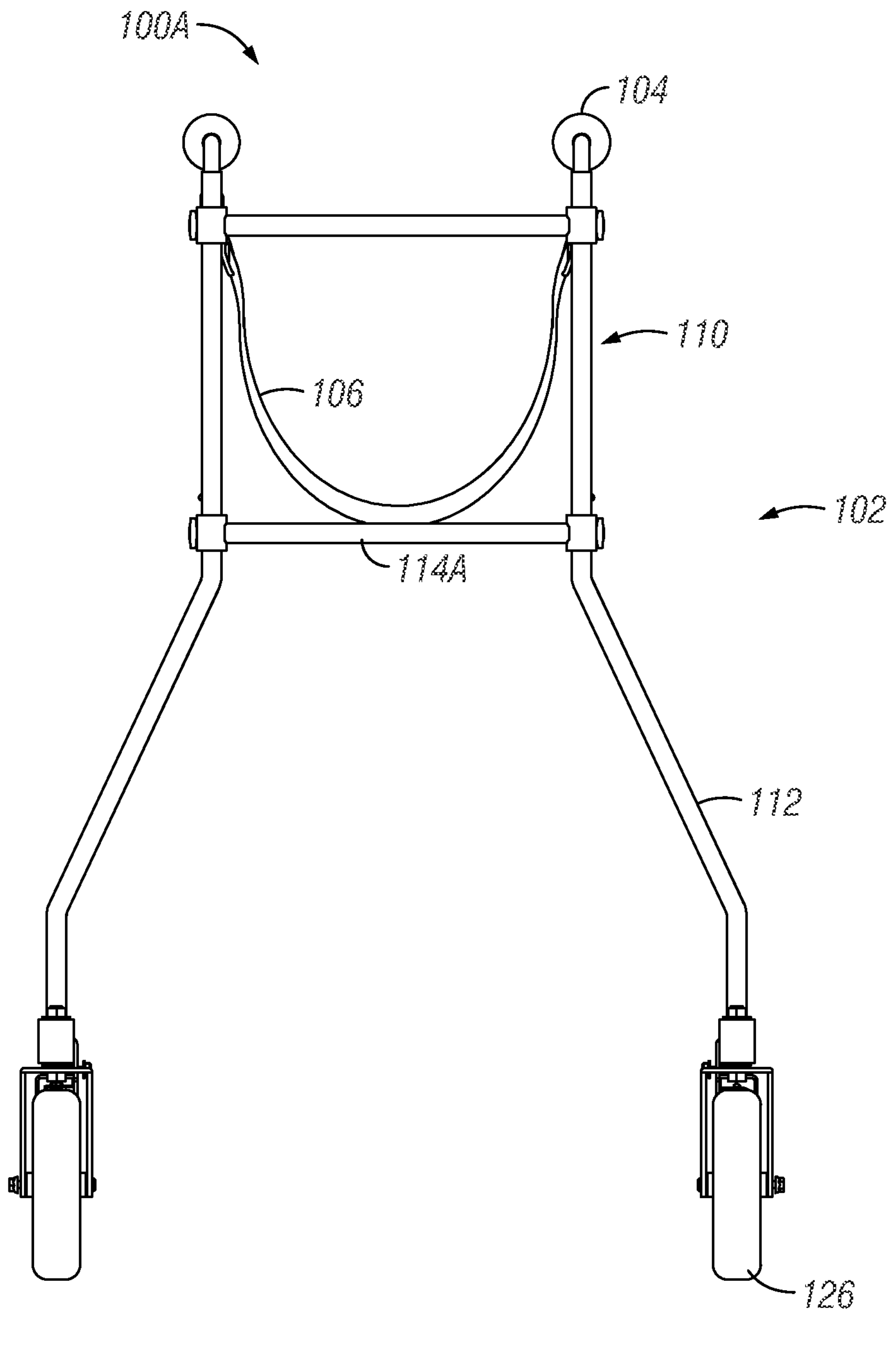
FIG. 3 is a front elevation view of the walking device of FIG. 1.

FIGS. 1-3 show exemplary aspects of a walking device 100, which will also be referred to as a lowered or short version of a walking device 100A. The walking device 100, as will be understood, is used to aid people with limited mobility to allow them to have the freedom to move without the aid or another person, or with limited aid. The walking device 100 (also referred to as a walker) is configured to support the individual using the device in an easy to use manner, while providing safety and confidence to the user.

Accordingly, the walking device 100 includes a frame 102, which includes an upper frame portion 110 and a lower frame portion 112. The upper frame portion 110 comprises telescoping sections 111A and 111B, which are telescopingly fit within one another to allow for height adjustment of the walking device 100, which will be covered herein. However, it should be appreciated that the walking device 100 could be used with varying heights of users and should not be limited to any particular height range for users. According to at least some aspects of some embodiments, it is envisioned that the walking device 100 could be used with individuals ranging from 5-foot to 6-foot, 10-inches. However, as will be appreciated, variations could be made to the components to allow for shorter or taller users, and the exact height of the user is not limiting on the novelty of the disclosure.

The upper frame 110 is generally box, squared, or otherwise rectangular in shape. There are a plurality of telescoping, vertical components 111A and 111B, as well as at least one crossbar 114A, which aids in supporting the frame. The crossbar(s) 114A could be horizontal, crisscrossed in an X-shape, or otherwise provided to support the frame 110. In addition, the number of crossbars 114A may vary according to exact configuration of the device 100. As shown best in FIG. 1, the upper frame 110 includes four crossbars 114A, with two being generally parallel to one another in the direction of travel, and two perpendicular to the direction of travel and parallel-spaced in a vertical manner to one another at generally the front of the device 100.

At an upper portion of the upper frame 110 and connected or positioned at the crossbars 114A in the direction of travel are body supports 104. The body supports 104 are used to receive a body part of the users (e.g., hands and/or under armpits), and thus, may include padded portions for comfort. According to at least some aspects of some embodiments, the body supports 104 are foam, rubber, padding, or other pliable members that provide comfort to the user using the device.

The lower frame 112 angles outwardly and obliquely from the upper frame and is generally wider than the upper frame 110. The shape of the lower frame 112 provides additional stability to the device 100. Additionally, as shown in the figures, there are a plurality of crossbars 114B at the lower portion that provide support and stability for the device. The crossbars 114B are shown to be generally horizontal but may take different orientations and numbers according to the needs and embodiments of the device. As shown best in FIG.

2, the lower crossbars 114B are generally parallel to one another on opposite sides of the device 100, with a pair at or near the location of the wheels for moving the device.

The frame 102 components are shown to be round bars, but it is contemplated that the support members of the frame, including the upper portion 110, lower portion 112, as well as any crossbars, could be generally any shape to provide the necessary support for the device, while also keeping the device relatively lightweight and maneuverable. Likewise, the shape, length, and thickness of the body support 104 could vary.

Shown throughout the figures, and attached at or near an apex of the upper frame 110, is a securing member 106, which is used to support or otherwise secure a user in the device 100, which provides greater security for use thereof. According to some embodiments, the securing member 106 comprises a belt. However, it should be appreciated that other types of securing devices could be used, including, but not limited to, ropes, belts, drawstrings, chords, straps, bungees, clasps, or the like. In addition, while many of the securing devices have been described as somewhat flexible, it should also be considered that the securing mechanism be more rigid or stiff, such as straight or arcuate plates, bars, pads, or the like. In any case, additional comfort members, such as pads, pillows, vertical supports for backs, or the like could also be included with the securing member 104 to further enhance the confidence and ease of use of the device 100.

Figure 11:
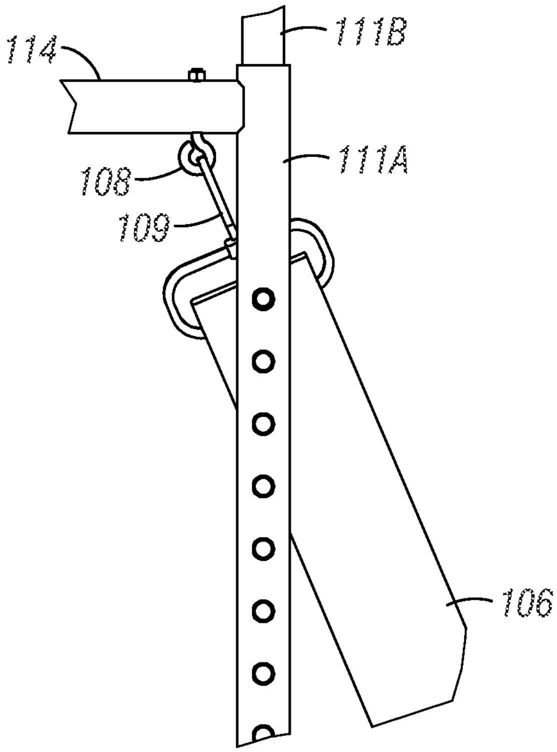
FIG. 11 is an enlarged view showing a security member according to aspects of at least some embodiments disclosed herein.
Figure 12:
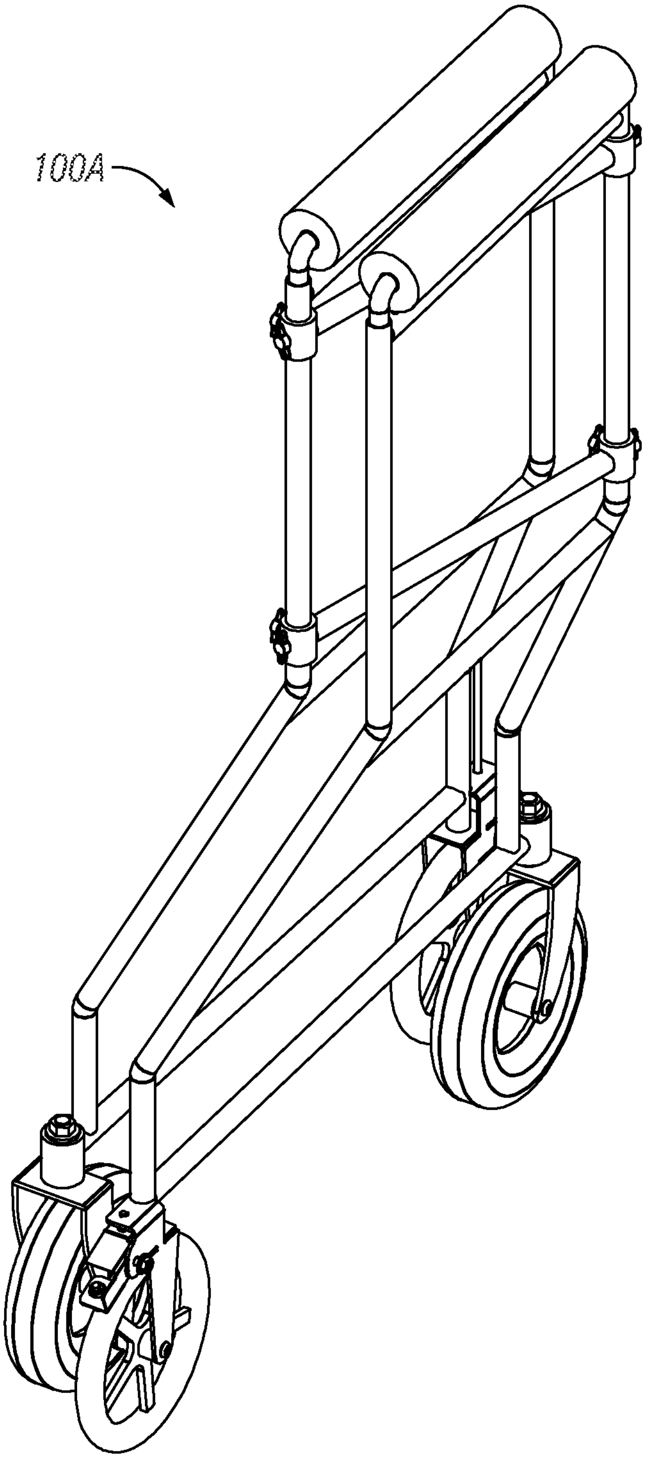
FIG. 12 is an isometric view of a walking device in a folded configuration.
Figure 13:
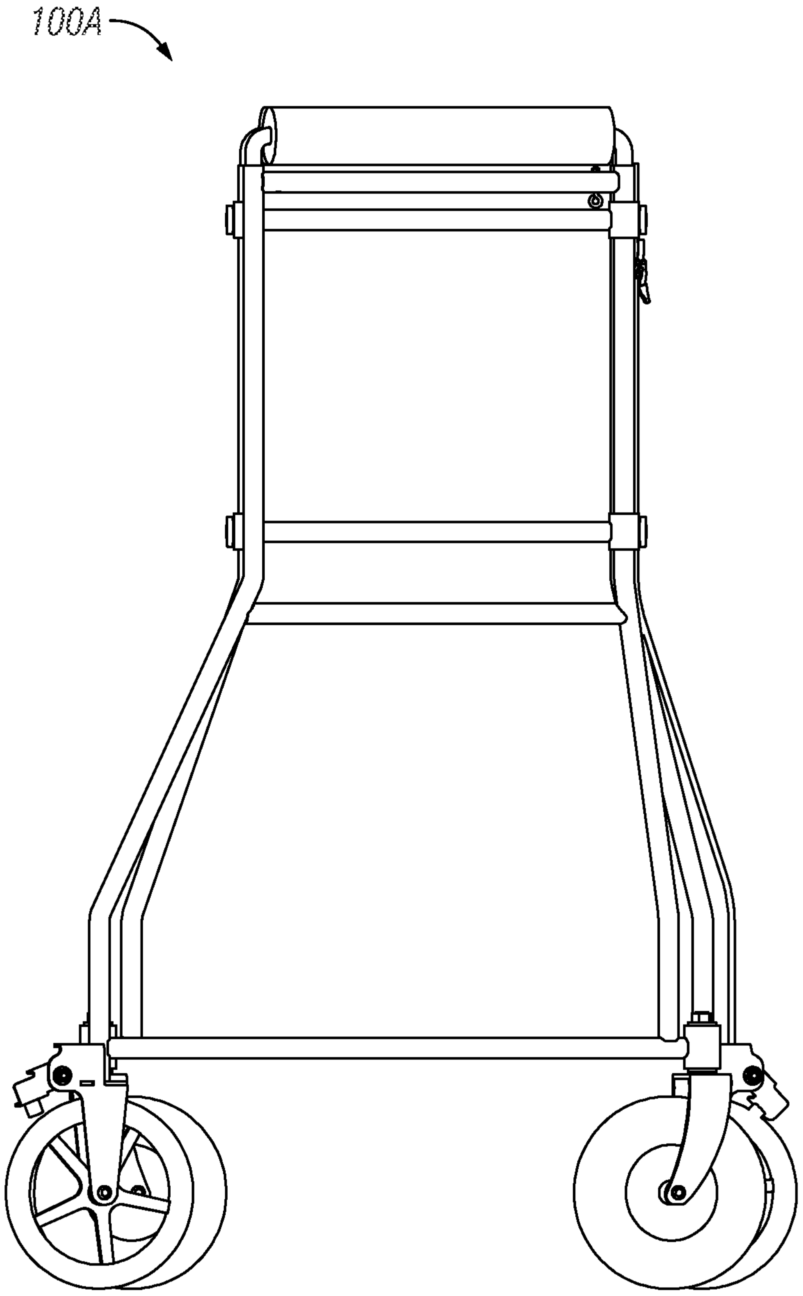
FIG. 13 is a side elevation view of the folded walking device.
Figure 14:
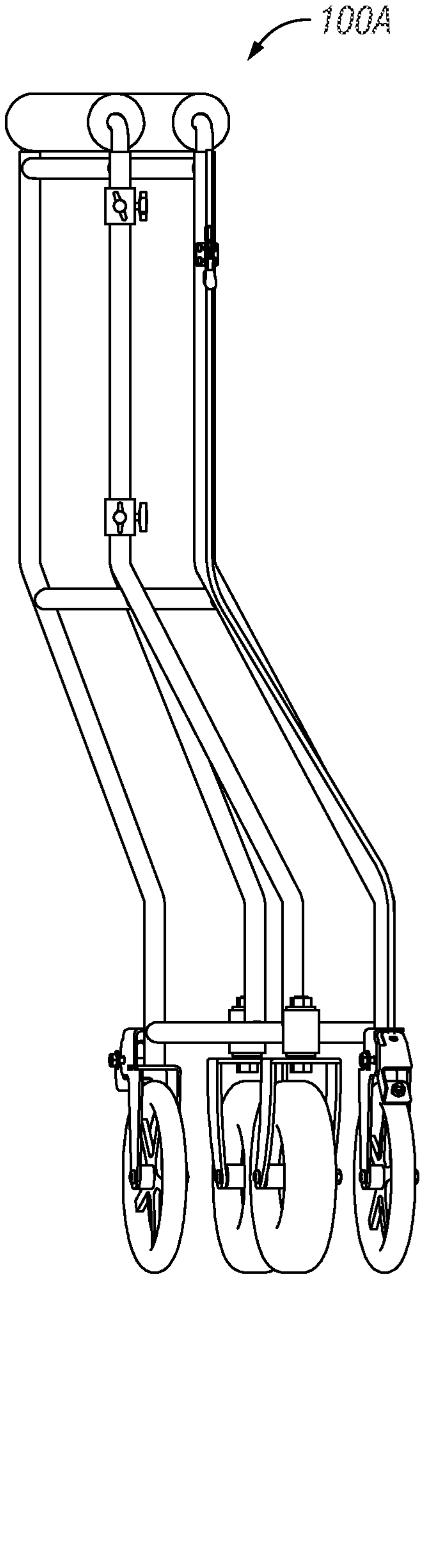
FIG. 14 is a front elevation view of the folded walking device.

FIG. 11 is an enlarged view showing an exemplary manner for connecting a belt 106 to the frame 102. As shown in FIG. 11, a mechanical fastener 108 in the form of an eye bolt and nut are connected to a crossbar 114A of the upper frame 110. However, it should be appreciated that other types of mechanical fasteners could be used. The belt 106 includes clasps, clips, or other mechanical connectors 109 at the ends of the belt. As shown in the figures, the belt includes an overlapped portion that receives a clip connected to the clip to connect the clip thereto. The clips 109 or other connection members connect to the mechanical fasteners 108 (i.e., eye bolt in FIG. 11) to temporarily and releasably secure the belt or other securing member 106 to the frame. This allows the belt 106 to be disconnected to allow a user to enter or exit the interior portion of the frame 102 for use of the walking device 100. According to various aspects and/or embodiments, the belt may be adjustable in length. Thus, the mechanical fastening of the securing member 106 to the frame provides additional support and confidence for a user.

Figure 5:
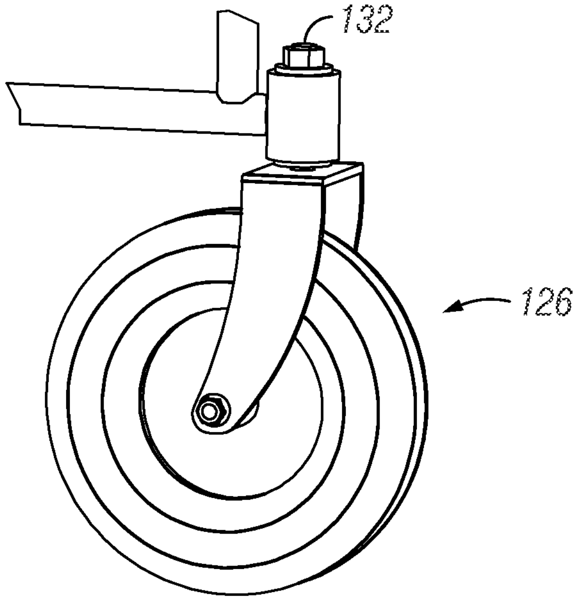
FIG. 5 is an enlarged view of a front wheel assembly of a walking device according to aspects and/or embodiments disclosed herein.

At lower ends of the frame 102, and generally positioned at the bottom of the lower frame portion 112 are wheels. The wheels include front wheel 126 and rear wheels 130. The front wheels 126 are shown in greater detail in FIG. 5, and the front wheels 126 comprise casters or other swiveling abilities that allow the front wheels 126 to swivel relative to the frame 102. As shown in FIG. 5, a portion of the frame crossbar 114B is directly connected to a portion of the wheels 126, and the lower wheel assembly is rotatable in relation thereto. This provides steering capabilities for the walking device 100. The front wheels 126 may comprise rubber or other materials that provide reduced slipping relative to a surface, and which are also sturdy enough to withstand use of the device on a variety of surfaces. The wheels 126 may includes treads or the like to aid in movement of the device. In addition, the wheels may comprise pneumatic swivel casters.

Figure 4:
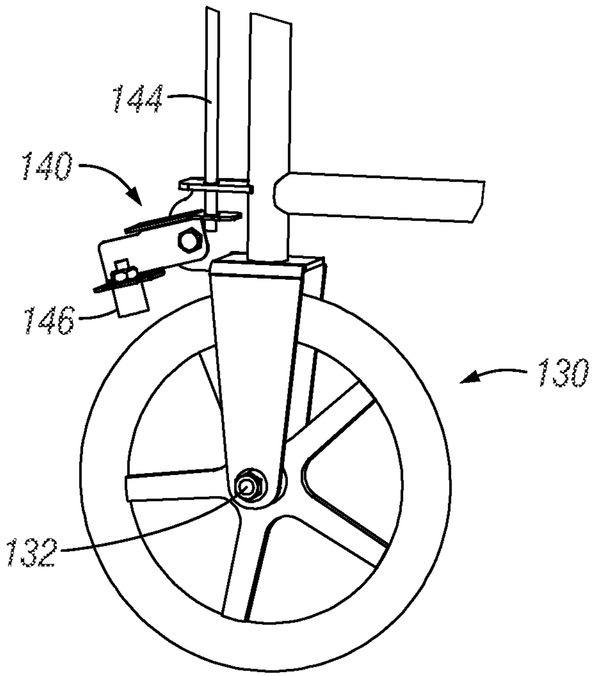
FIG. 4 is an enlarged view of a rear wheel assembly of a walking device according to aspects and/or embodiments disclosed herein.

The walking device also includes rear wheels 130, which are positioned on opposite sides of the lower frame 112 and are shown to extend from a generally vertical portion of the lower frame 112. The rear wheels, according to the embodiment shown in FIG. 4, are generally fixed relative to the frame, such that they will not, or will not substantially swivel or otherwise turn. The wheels 130 include spokes 134 and an axle 132. Similar to the front wheels, the rear wheels 130 comprise a durable material that will last, while also providing support and security for use on a variety of surface types.

According to at least some embodiments, and as shown in the figures, a brake assembly 140 is provided. The brake assembly 140 is used to slow down and stop the walking device by the user or another aiding the user. The brake assembly 140, as shown in FIGS. 1-16, include at least one hand brake 142 positioned at the upper frame portion 110 of the walking device 100. In fact, the figures, shown first and second hand brakes on opposite sides of the upper frame, and generally positioned at or near the rear of the frame 102. The hand brakes 142 may be mechanical or hydraulically activated, wherein squeezing or activation of the hand brake 142 activates a brake line 144 connected to a friction member 146. The brake line 144 may be a cable, and the friction member 144 may comprise a rubber bumper brake. In use, squeezing or otherwise activating the hand brake 142 activates the brake line 144, such as by mechanically moving the line according to the movement of the hand brake 142. This corresponds to a movement, such as in a rotational direction, of the friction member 144. The rubber bumper 144 may be rotatably moved into contact with the rear wheel itself, which will slow down and/or stop the wheel from rotating, thus stopping the walking device.

The brakes on either side of the frame may be operated independently of one another or may be operated in conjunction with one another. This means that operation of one hand brake may activate both braking mechanisms at the wheels, such as via a common brake line or cable. Still further, a single hand brake may be connected to multiple braking mechanisms at the wheels such that a single operation will slow down and eventually stop both wheels.

In addition, while the rubber braking member 144 is shown to contact an outer periphery of the rear wheel 130, it should be appreciated that it could be placed inward, such as in contact with an inner disc portion of the wheel, where the friction would still be applied to slow down and eventually stop the rotation of the wheel. Still other types of brakes are considered to be a part of the disclosure. The brake 140 at the wheel could be a rim brake, disc brake, or drum brake. Rim brakes are so called because braking force is applied by friction pads to the rim of the rotating wheel, thus slowing it and the device 100. Brake pads can be made of leather, rubber or cork and are often mounted in metal "shoes".

Additional features of the walking device of the present disclosure include the ability to make the device height adjustable. For example, FIGS. 1-3 show a walking device 100A of a first height, such as at the lowest height setting. However, the device is intended to be used by people of various heights, and therefore, aspects include the ability to change the height of the frame, which will ensure that the device can be comfortably used by people of all sizes and heights.

Figure 6:
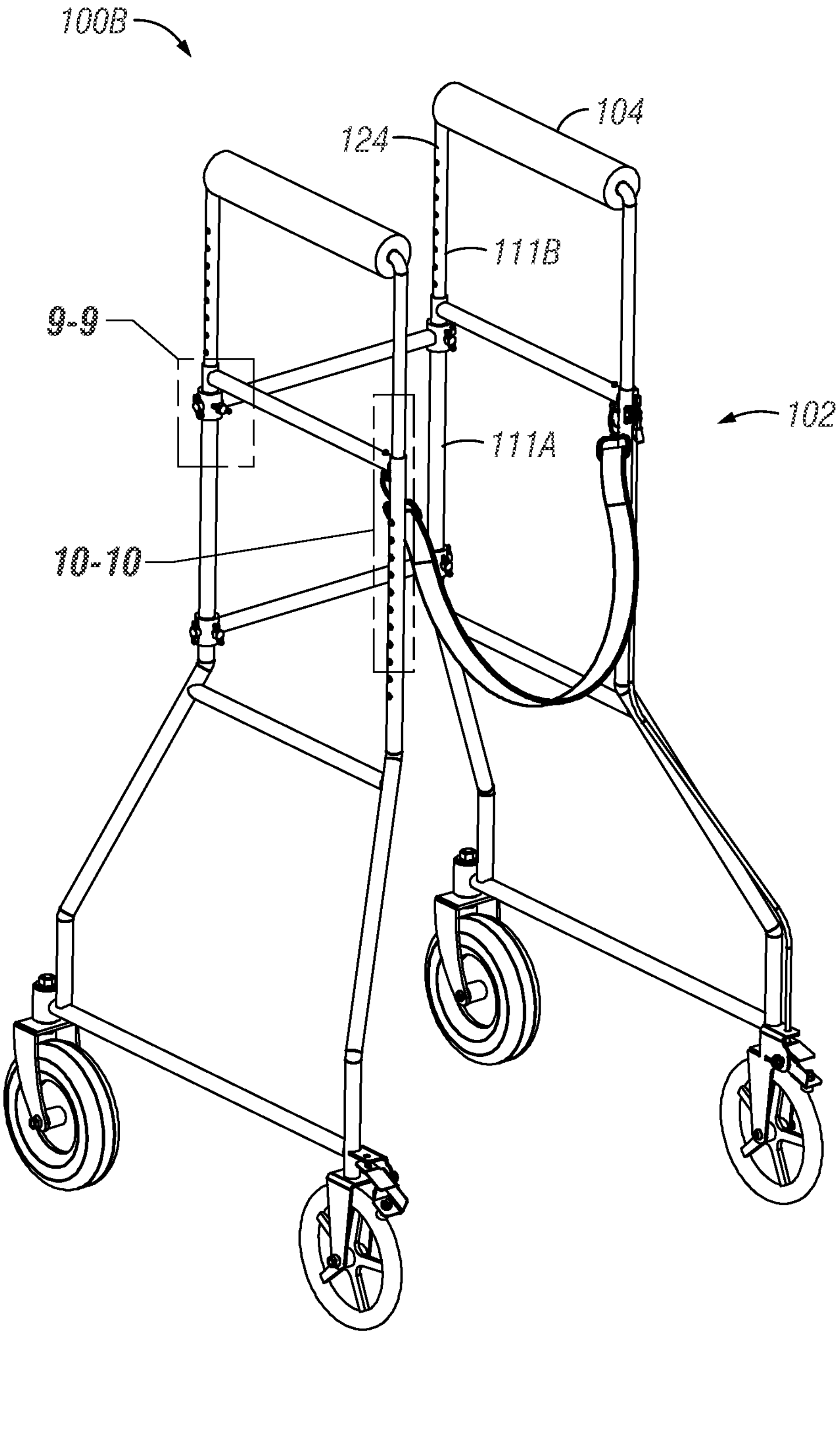
FIG. 6 is another isometric view of a walking device according to aspects and/or embodiments disclosed in the specification.
Figure 7:
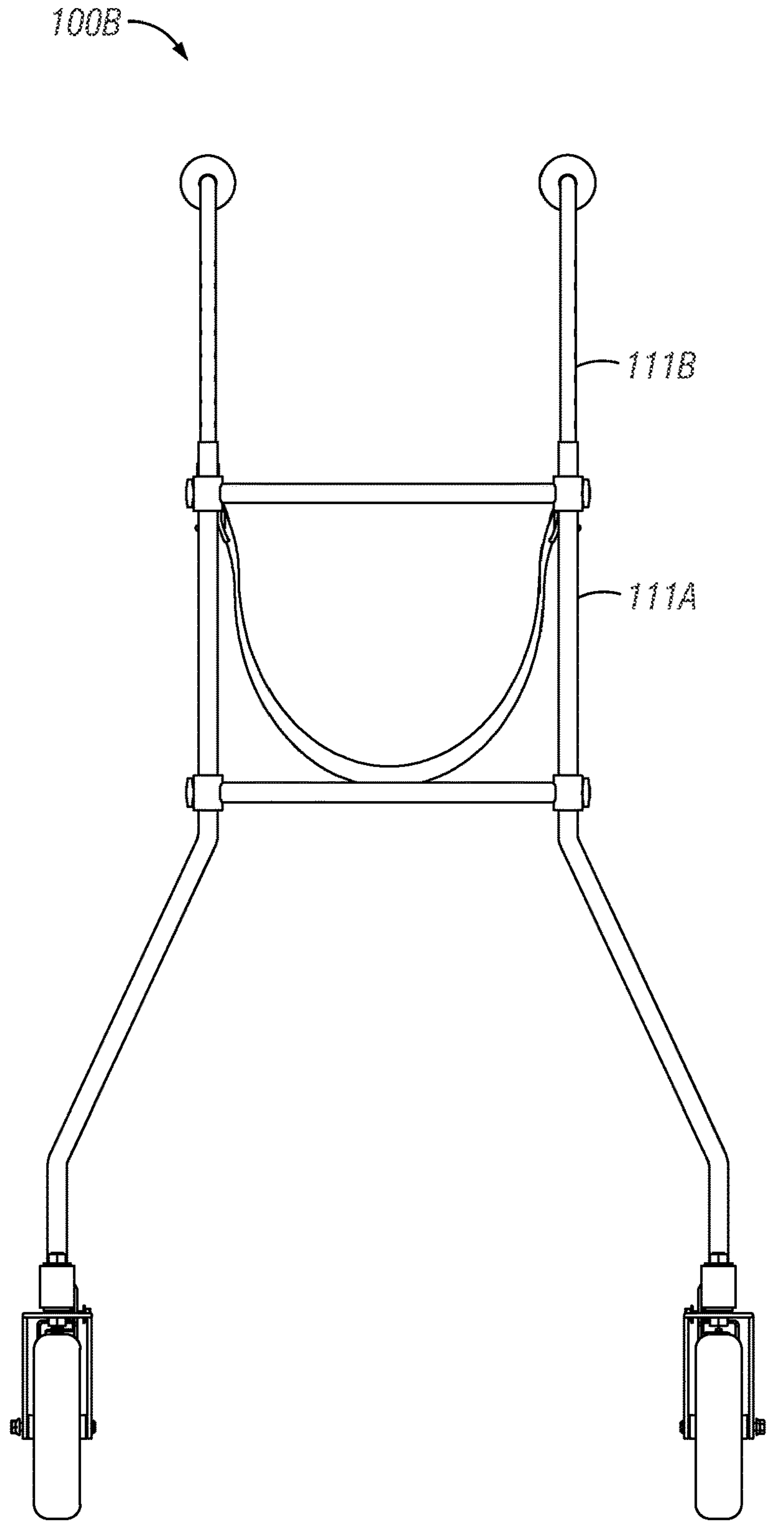
FIG. 7 is a front elevation view of the walking device of FIG. 6.
Figure 8:
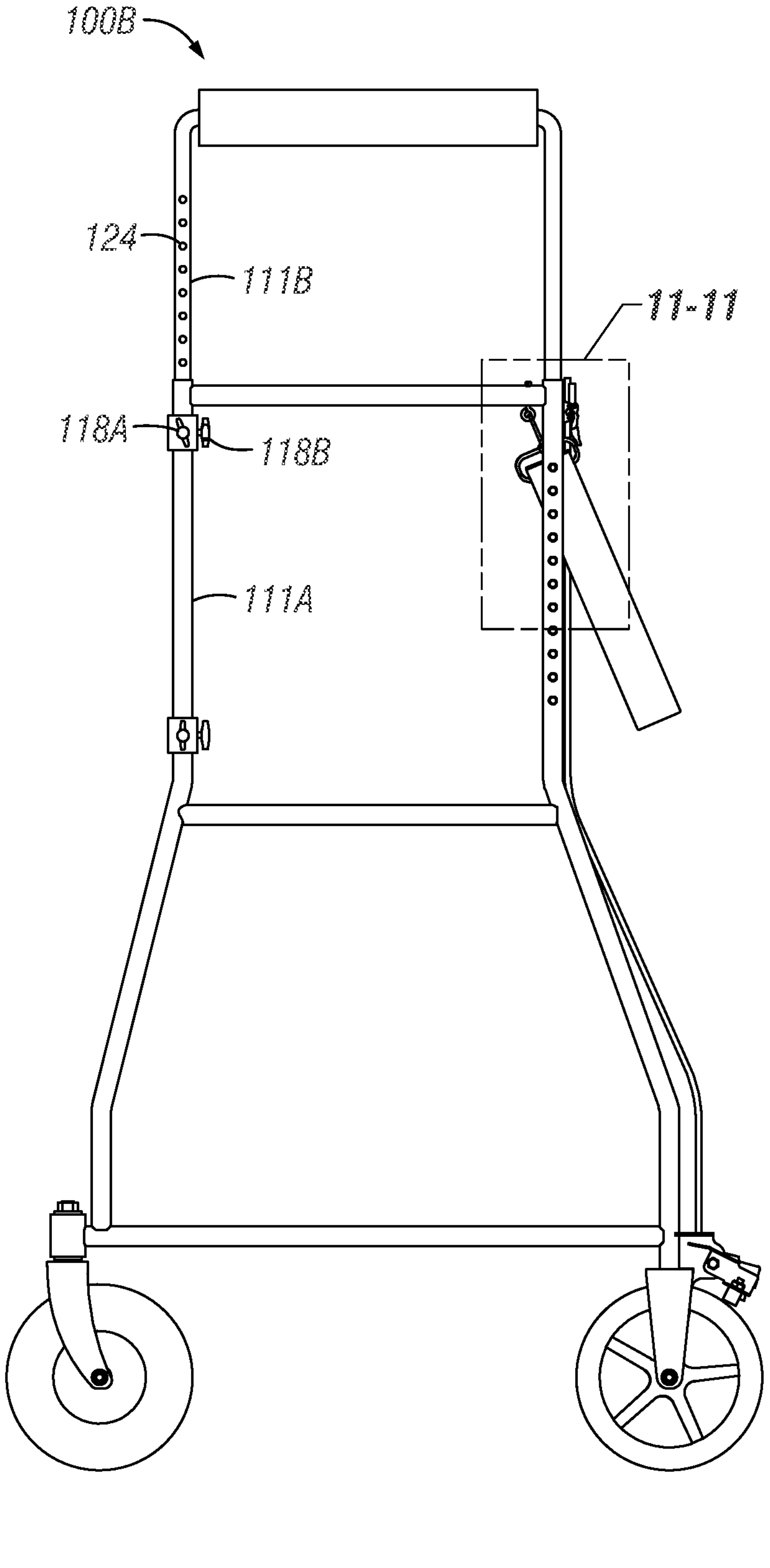
FIG. 8 is a side elevation view of the walking device of FIG. 6.

FIGS. 6-8 show a walking device 100B set at another height, which is taller than that shown in FIGS. 1-3. As noted, the upper frame 110 includes telescoping sections 111A and 111B, which provide the for the height adjustment. As shown in FIGS. 6-8, the inner telescoping member 111B is extended relative to the outer telescoping member 111A, and the telescoping members are held in place at the height.

As shown throughout the figures, and in particular in FIG. 8, the telescoping members 111A and 111B include a plurality of apertures 124 vertically spaced along their lengths. As will be understood, the apertures are used with mechanical fastening mechanisms to hold the telescoping members in place relative to one another in order to provide the desired height to account for the height and/or abilities of the user of the device 100.

Figure 9:
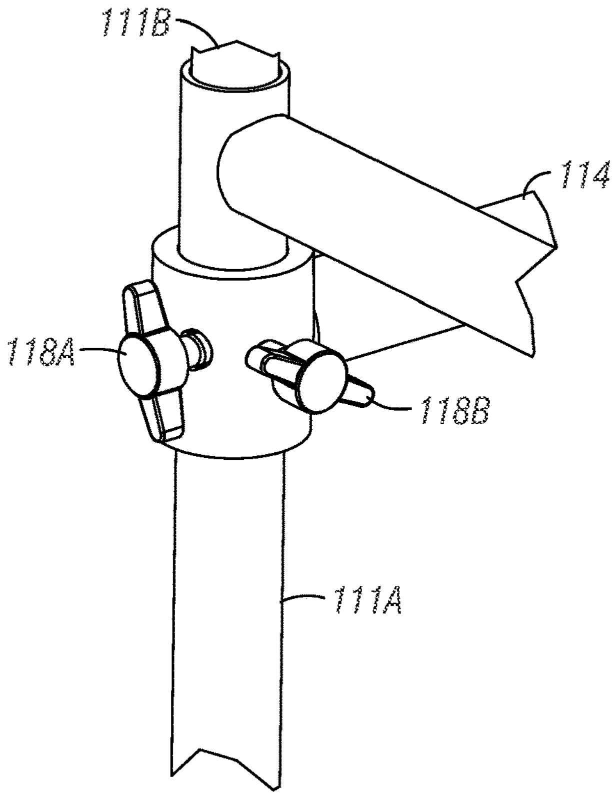
FIG. 9 is an enlarged view showing a manner of securing the frame of the walking device in various heights.

FIG. 9 shows an enlarged portion of FIG. 6, showing a front height adjustment mechanism 116. The mechanism 116 is used at the front of the upper frame 110 of the walking device 100B, and is used to hold the inner telescoping member 111B in a raised position relative to the outer telescoping member 111A. As shown in FIG. 9, mechanical fasteners 118 are used to hold the telescoping members in place. For example, a first mechanical fastener 118A extends through a pair of aligned apertures 124 and into a portion of a crossbar 114 at the front of the frame 102. This first fastener 118A holds the telescopic tube and also is used to lock the walking device 100B from folding. The fastener 118A is shown to be a thumb screw, but other fasteners can be used.

Also shown in FIG. 9, a second mechanical fastener 118B extends through another aperture in the frame 102. This fastener is shorter and puts pressure on the inner portion of the frame to hole the frame components in place. The second fastener 118B is also shown to be a wing bolt, but could be other types of fasteners.

Figure 10:
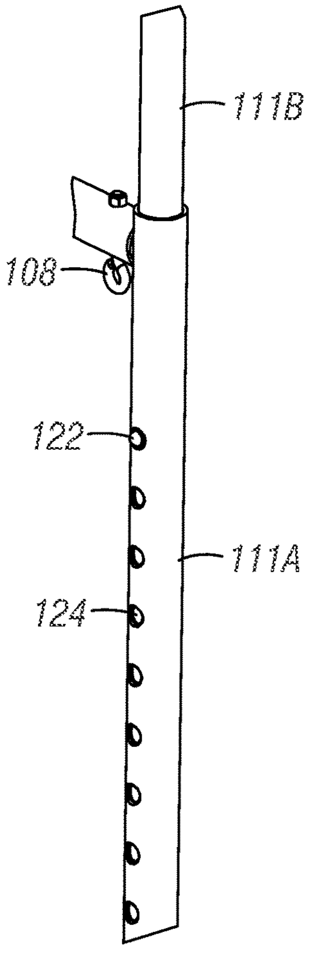
FIG. 10 is an enlarged view showing another manner of securing telescoping portions of a frame of a walking device.

FIG. 10 shows another enlarged portion of the frame of FIG. 6, showing the rear telescoping members. At the rear of the frame 102, the telescoping members can be connected at various heights by mechanical fasteners. For example, the thumb or wing bolts could be used through apertures 124 of the telescoping members to hold the members in place relative to one another. Still further, as is shown in the figure, the inner telescoping member 111B could include a spring steel button pin 122, which is configured to extend through an aperture 124 of the outer telescoping member 111A. As shown in FIG. 10, the button pin is extending through the uppermost aperture, putting the walking device 100B in the highest configuration. However, the positioning of the button 122 through any of the apertures will allow for the heigh adjustment of the device to any of the selected heights associated with the aperture locations.

Thus, the combination of the mechanical fasteners at the front and rear telescoping members of the upper frame 110 provide for the height adjustment of the walking device to account for varying heights and/or abilities of a user. This is shown pictorially in FIG. 16, wherein the walking device 100 is shown to be shorter than the walking device 100B, and the difference is shown by the arrow 115 between the devices. It should be appreciated that FIG. 16 may show the extremes for a walking device, and that the device's height could be positioned generally between either of the heights shown.

Still further, FIGS. 12-15 show additional aspects of the disclosure. The walking device 100 can be folded from the position shown in FIG. 1 to the configuration shown in FIG. 12, which allows for easier transport and/or storage of the device. The folding reduces the width of the device to reduce the amount of space taken up by the device. As noted, the mechanical fasteners 118A hold the telescoping members in place relative to one another, and also aid to stabilize the device. To fold the device, the fasteners can be removed.

Figure 15:
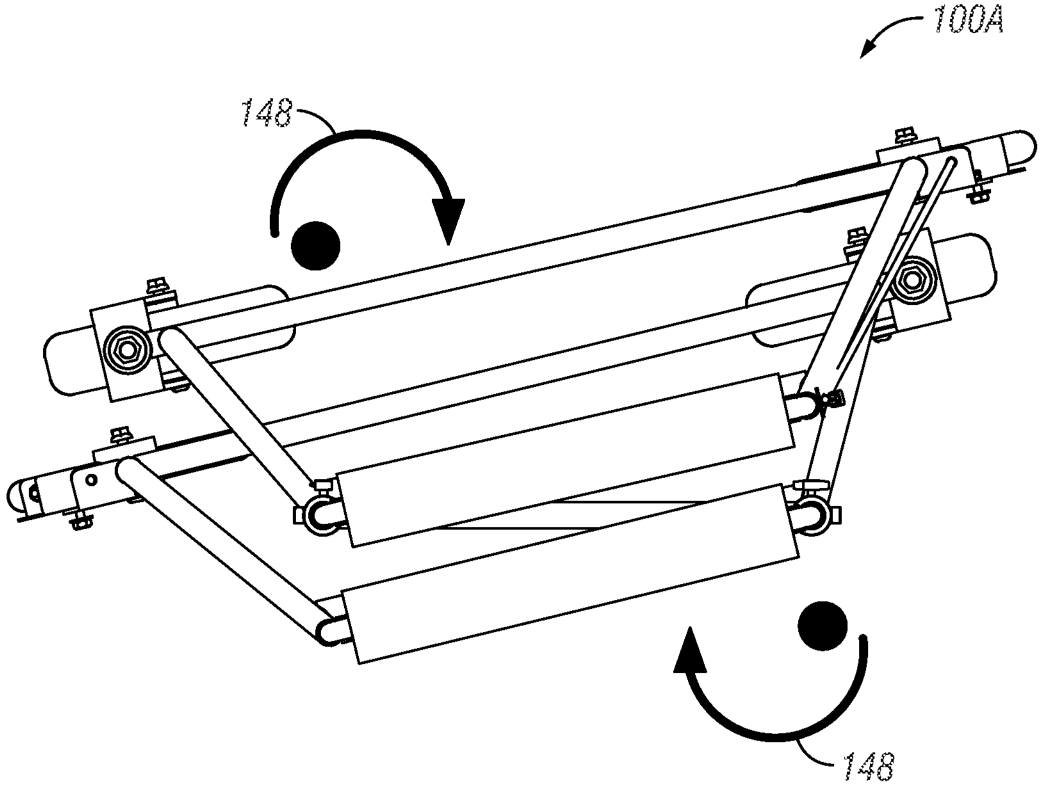
FIG. 15 is a top view indicating how the walking device can be folded.
Figure 16:
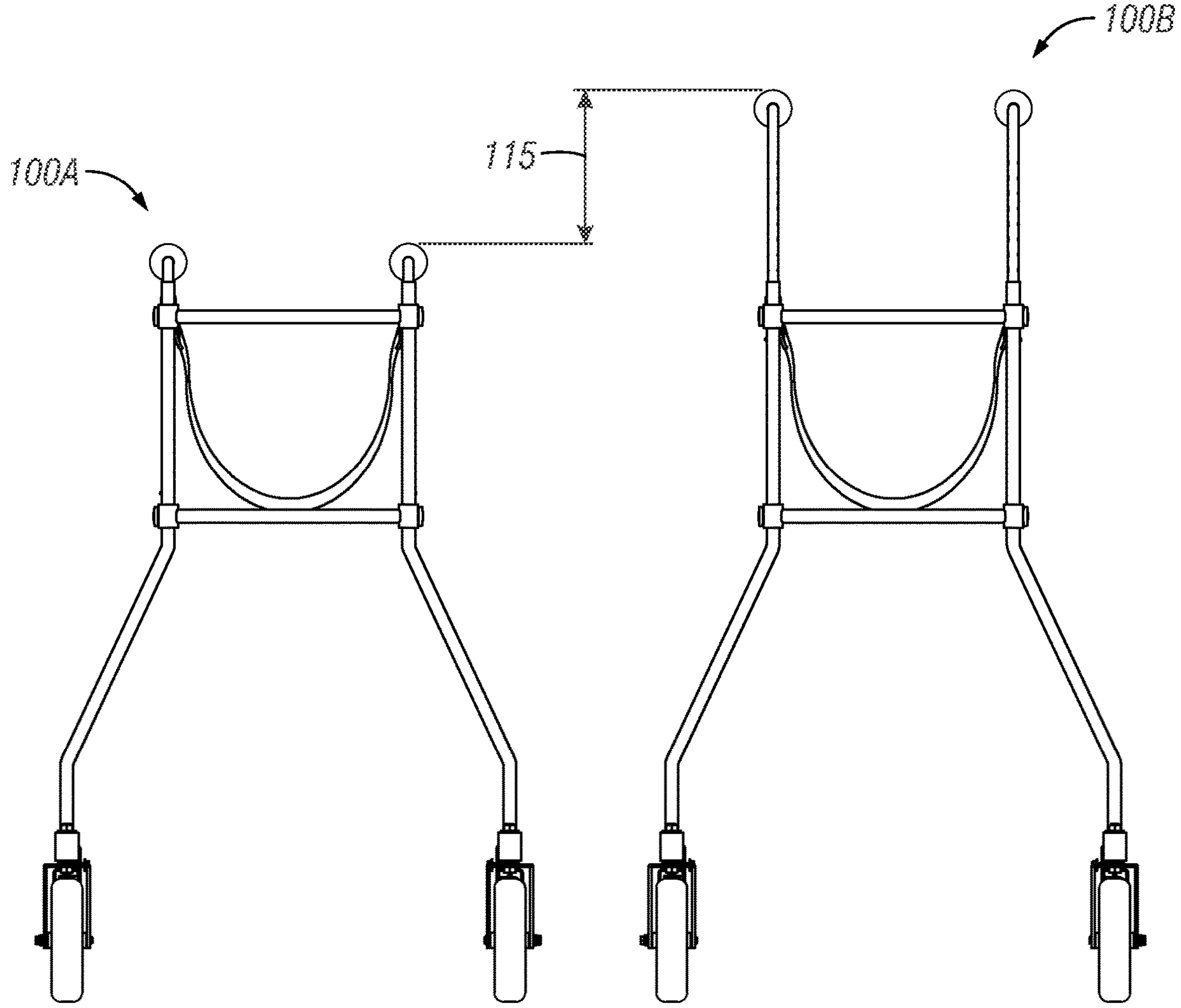
FIG. 16 is a front elevation view showing a walking device according to aspects and/or embodiments of the present disclosure in lowered and raised configurations.
Figure 17:
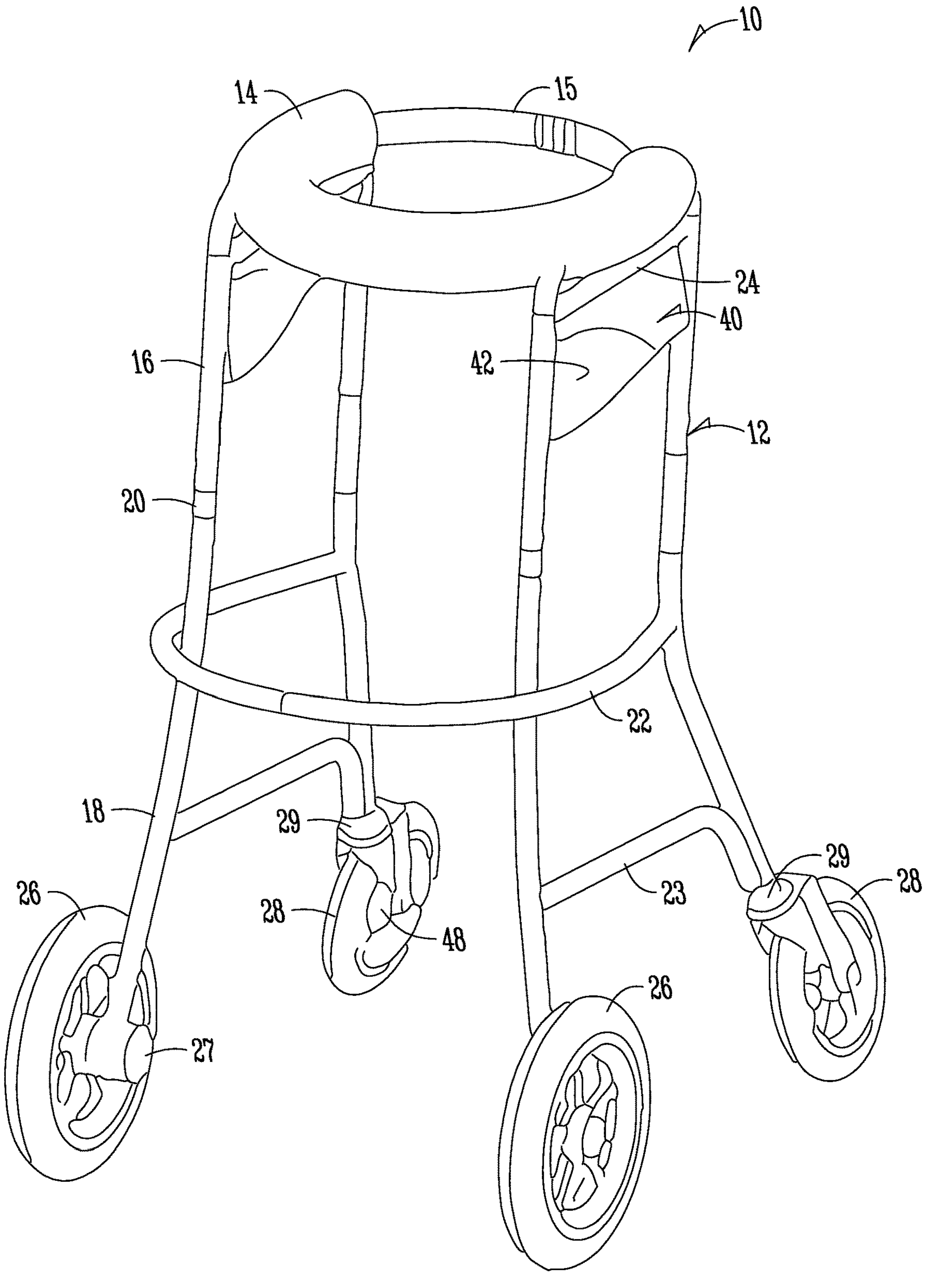
FIG. 17 is a perspective view of a walking device according to aspects of the invention.
Figure 18:
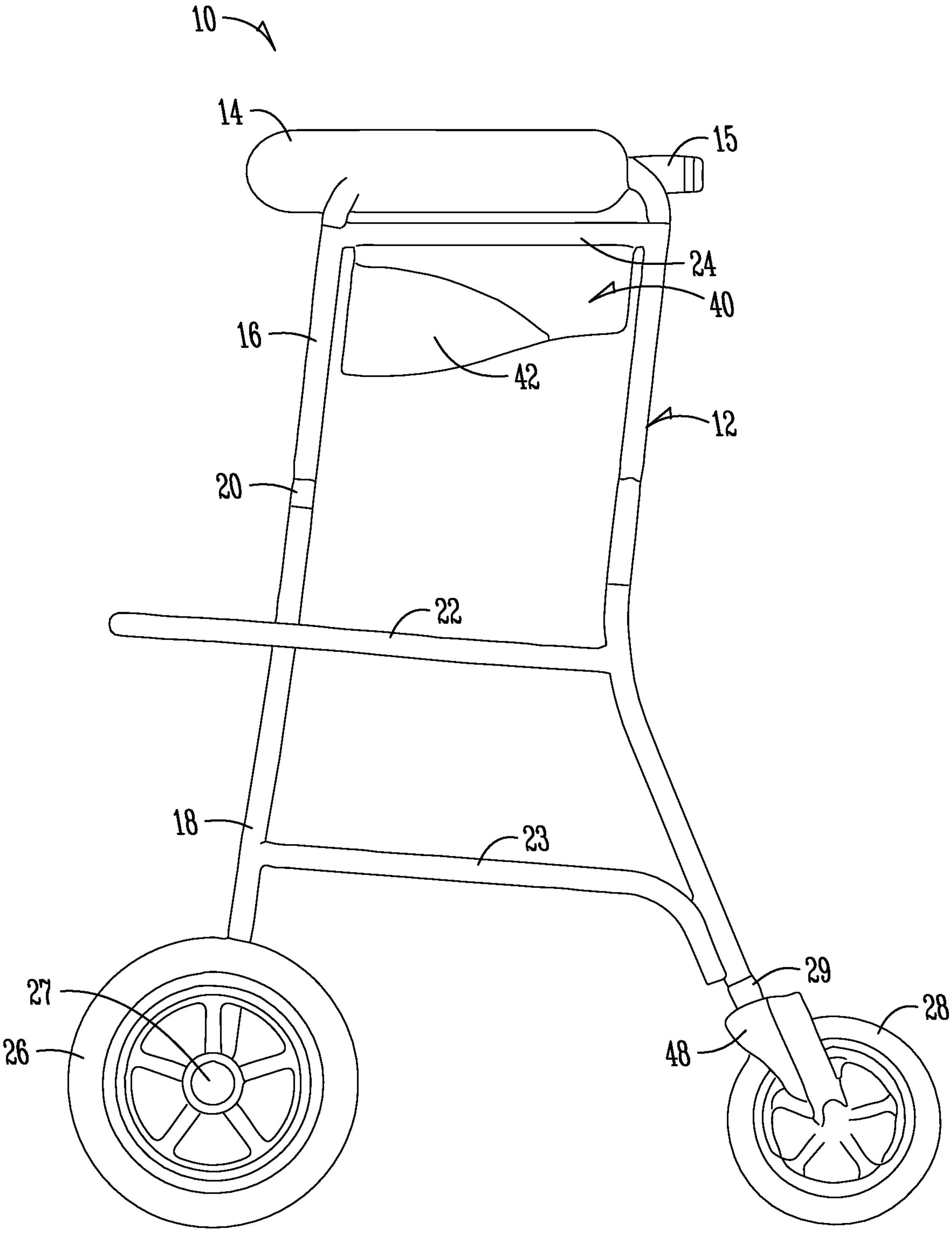
FIG. 18 is a side elevation view of the walking device.
Figure 19:
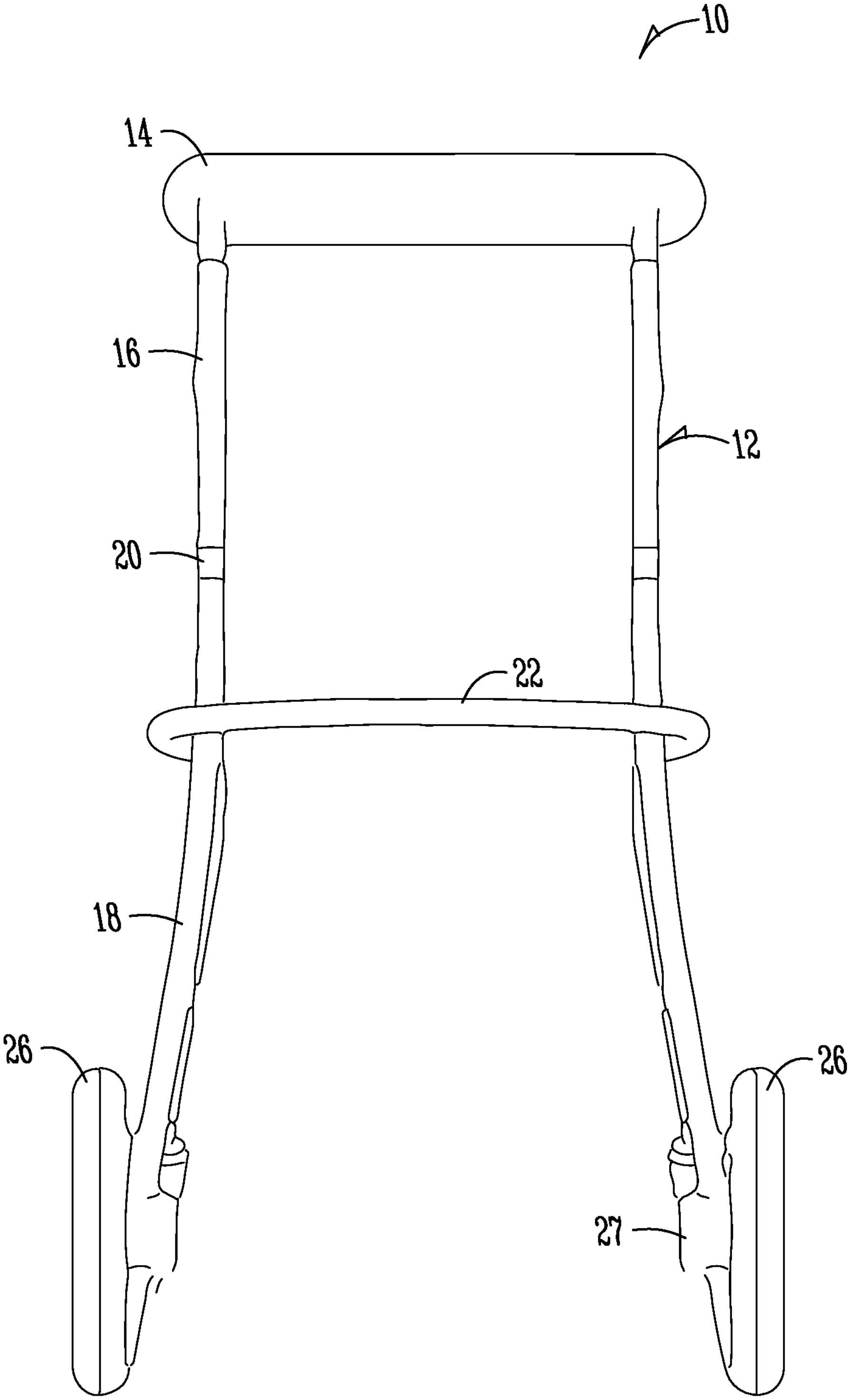
FIG. 19 is a front elevation view of the walking device.

Next, as best shown in FIG. 15, the side frame portions can be rotated relative to one another in the direction of the arrows 148A and 148B. The vertical frame portions are surrounded by portions of the crossbars and can rotate within said portions. This will allow the frame 102 to collapse upon itself to position the side portions of the frame 102 to be generally adjacent one another in the reduced width.

To unfold or otherwise reset the frame, the side frame portions are rotated in the reversed direction until the crossbars are extended between the sides of the frame. The mechanical fasteners can be replaced, thus, supporting the frame portion for use.

It should be appreciated that reducing the height of the device 100 prior to folding may also reduce the amount of space needed for the device during transport and/or storage, and thus, a user may move the telescoping members to reduce the height to the lowest setting prior to folding the device into the configuration shown.

FIGS. 17-23 show additional aspects and/or embodiments of a walking device 10. The walking device 10 comprises a frame 12. The frame 12 includes an upper section or part 16, and a lower section or part 18. The frame 12 includes multiple parts connected together, which will provide stability, security, as well as additional features, such as height adjustment, which will be disclosed herein. The exact number and configuration of the components comprising the frame 12 is not to be limiting, and it should be understood that the makeup can be varied, while still maintaining the inventive concepts. For example, in the figures, the upper portion 16 of the frame includes generally a circular or otherwise arcuate shape, which is suited well to support a user of the device 10, while also not including protruding corners or edges that could possibly snag or otherwise run into walls, furniture, doors, or the like. The generally circular or arcuate shape of the device streamlines the device and keeps the overall width to a manageable size.

In addition, the frame may comprise a single robust bracket in which sides of the frame pivot for the frame to be in a folding/transport configuration to a use configuration. This may include slidable features that can be temporarily locked in place to hold the frame in the use configuration.

Figure 20:
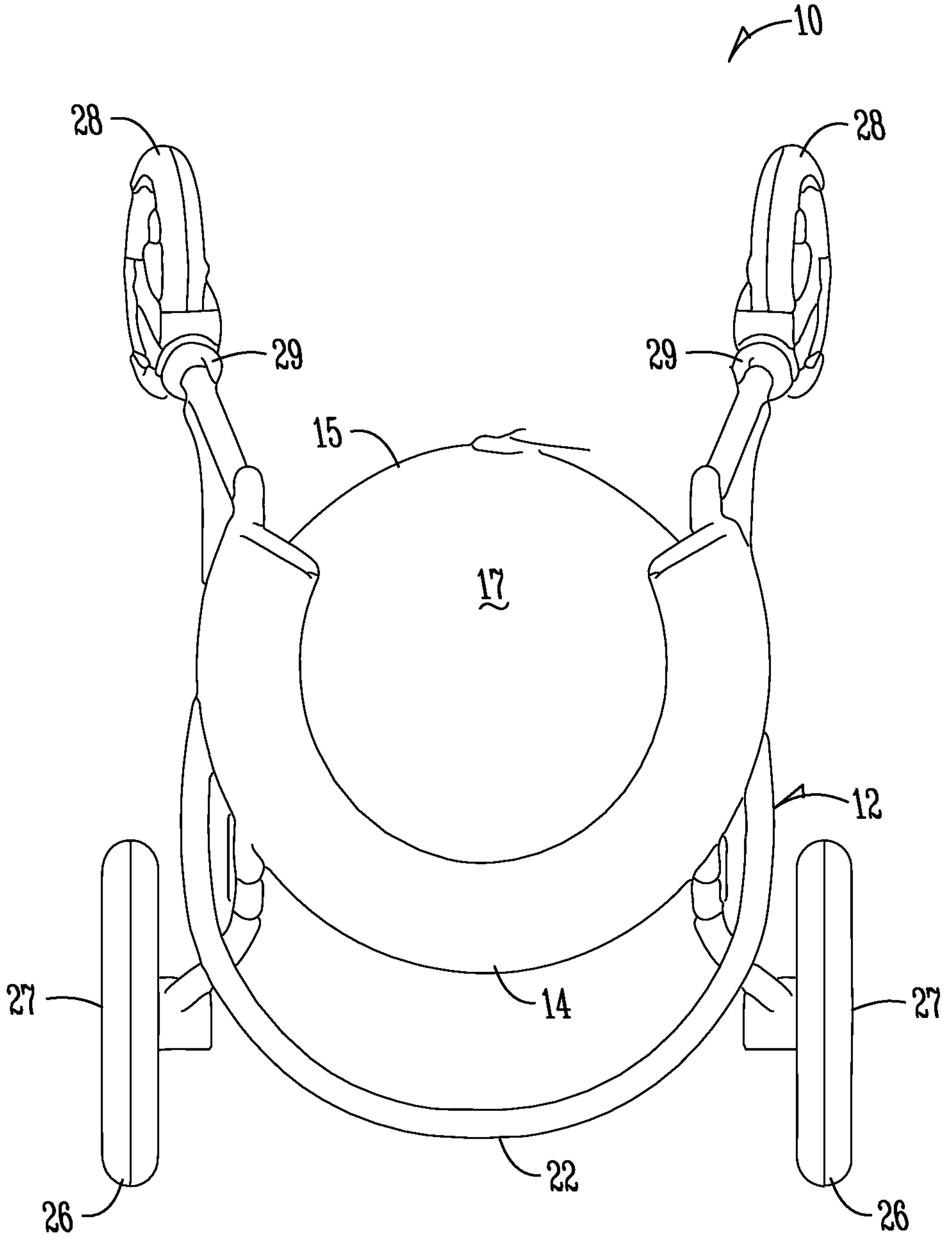
FIG. 20 is a top plan view of the walking device.

Furthermore, as best shown in FIG. 20, the frame 12 is not fully closed. A portion of the frame 12 is left connected by the frame supports 22 to allow a user to essentially enter into a portion of the frame such that the user is at least partially surrounded by the frame 12. The open portion of the frame 12 can be located generally anywhere around the periphery of the frame. For example, FIG. 20 shows the open portion 17 generally at the rear of the frame 12, which allows a user to enter into the center thereof. However, the device 10 could instead include an opening at a front portion, which would allow a user to back into the frame 12. Still further, while not shown, it is also contemplated that the device includes a seat, leg rest, or other lower extremity support member, such as positioned generally at or near the cross-supports 22 of the frame 12, and a user could back into the frame and rest on the seat or other support member and still use the device for mobility.

Additional embodiments and/or aspects include a foldable seat. The foldable seat can be moved from a seat down position to a seat up position and locked in either place so as to stay out of the way of the user.

At or near the apex of the upper portion 16 is a support member 14 and a securing device 15. The support member 14 generally covers the top support bars of the frame 12. The support 14 comprises a pliable material, such as rubber, foam, padding, or the like, and provides a resting support for a user to rest one or more body parts, such as upper extremities and chest, to provide support for the use of the device 10. As shown in the figures, the support member 14 is a comfort member that covers essentially the full portion of the top support bar, while leaving the opening to allow for entrance into the frame 12 of the device 10. According to at least some embodiments, the support member and top cross-bar extend approximately 270-degrees around the device. However, it should be appreciated that this is not to be limiting, and the support member 14 can extend generally any amount, and also can include a plurality of unconnected, intermittent sections positioned at the upper end of the frame 12 to provide selective cushioning and support for the user.

According to some embodiments, the arm supports 14 represent more of a crutch form which is more comfortable.

The frame 12 components are shown to be round bars, but it is contemplated that the support members of the frame, including the upper portion 16, lower portion 18, as well as any crossbars and/or arcuately-shaped bars, could be generally any shape to provide the necessary support for the device, while also keeping the device relatively lightweight and maneuverable.

Included with the support member 14 at the upper portion 16 of the frame 12 is a securing member 15. The securing member 15 is a device that extends at least the length of the opening 17 of the frame, and generally extends between opposite ends of the support member 14. The securing member is used to further support and secure a user in the device 10, which provides greater security for use thereof. According to some embodiments, the securing member 15 comprises an adjustable length belt with multiple attachment lengths to suit users of various sizes and/or abilities. As shown in the figures, the belt 15 includes two sections that are connectable to one another at varying lengths. However, it should be appreciated that other types of securing devices could be used, including, but not limited to, ropes, belts, drawstrings, chords, straps, bungees, clasps, or the like. In addition, while many of the securing devices have been described as somewhat flexible, it should also be considered that the securing mechanism be more rigid or stiff, such as straight or arcuate plates, bars, pads, or the like. In any case, additional comfort members, such as pads, pillows, vertical supports for backs, or the like could also be included with the securing member 15 to further enhance the confidence and ease of use of the device 10.

As disclosed, the frame includes an upper portion 16 and a lower portion 18. This includes a plurality of generally vertical members. As shown, four vertical members are used for the frame 12, but it should be appreciated that the exact number of vertical members should not be limiting on the invention. One or more of the upper and lower portions can also include crossbars 22, 23, which provide additional support for the frame, especially when supporting a user in combination with the frame 12. The size, number, and/or location of the crossbars could vary according to such factors including, but not limited to, intended use, size of user, ability of user, and the like.

Still further, it should be appreciated that the frame 12 is height adjustable, which allows for a greater variety of users and/or uses for the device 10. The figures show a location for a height adjustment device 20, which is generally between the upper and lower portions 16, 18 of the frame. The height adjustment 20 can take many forms. For example, according to some embodiments, the height adjustment 20 takes the form of an internal tube inside an outer tube of the upper or lower portions 16, 18 of the frame. The internal tube could include a push button spring, which can be single sided or dual sided. The spring can be from a piece of bent steel or torsion spring. The push button spring is depressed to have external piece be moved inside the outer tube of the frame, and the outer and inner tubes move relative to one another to adjust the height of the frame. The outer frame can include preset apertures to receive the protruding members of the push button spring to set the height of the frame for the varying heights of users.

Still further, additional adjustment mechanisms could be used. They could include, but should not be limited to, threaded members that are rotated or include a rotatable member to adjust the height, a clamp associated with an outer tube member to hold an inner tube in place after moving, an actuator (electric, pneumatic, or the like) that moves the frame, or generally any other means to move portions of the frame relative to one another to adjust the height, while still providing some locking mechanism to hold the components in place relative to each other. As disclosed, the height adjustments could be in preset positions, or could allow for customized standing heights for the frame 12.

Positioned generally at and extending from the lower portion 18 of the frame 12 is a plurality of wheels, which includes front wheels 26 and rear wheels 28. The figures show two front wheels 26 and two rear wheels 28, but the exact number of either could be varied to be more or less, as long as the wheels provide support for the device 10. For example, a single front wheel could be used with two or more rear wheels, while still supporting the device 10. In addition, tracks, balls, skis, or the like could be used in place of the wheels, such as depending on the intended use of the device.

The front wheels 26 are generally fixed with respect to the frame 12 and include an axis 27 that will be substantially perpendicular to the direction of travel of the walking device 10. The size of the wheels, composition of the wheels, and the like could be varied, however. The wheels shown in the figures can be pneumatically filled, solid, or no air wheels could be used with the device.

According to some embodiments, the front wheels are a pneumatic swivel caster with a manual lockout brake. This will allow the user or caretaker to push down with their foot on the lockout to engage and stabilize the unit.

The rear wheels 29 are shown to be attached to the frame such that the wheels are able to swivel in relation to the frame 12. A swivel connection 29 could connect the wheels 29 to the frame 12. The swivel connection 29 could allow for full 360-degree rotation of the wheels relative to the frame or could be limited. According to some embodiments, the rear wheels 29 are raked swivel wheels with a 30-60 degree of rotation in either direction relative to the direction of travel.

Additionally, the rear wheels can comprise a pneumatic swivel caster, but with no manual brake. These wheels will be modified to have a friction brake applied by way of a cable brake lever. This can be used by a caretaker to apply braking if the user has difficulty controlling their speed. It would be mounted flush when not needed.

Figure 21:
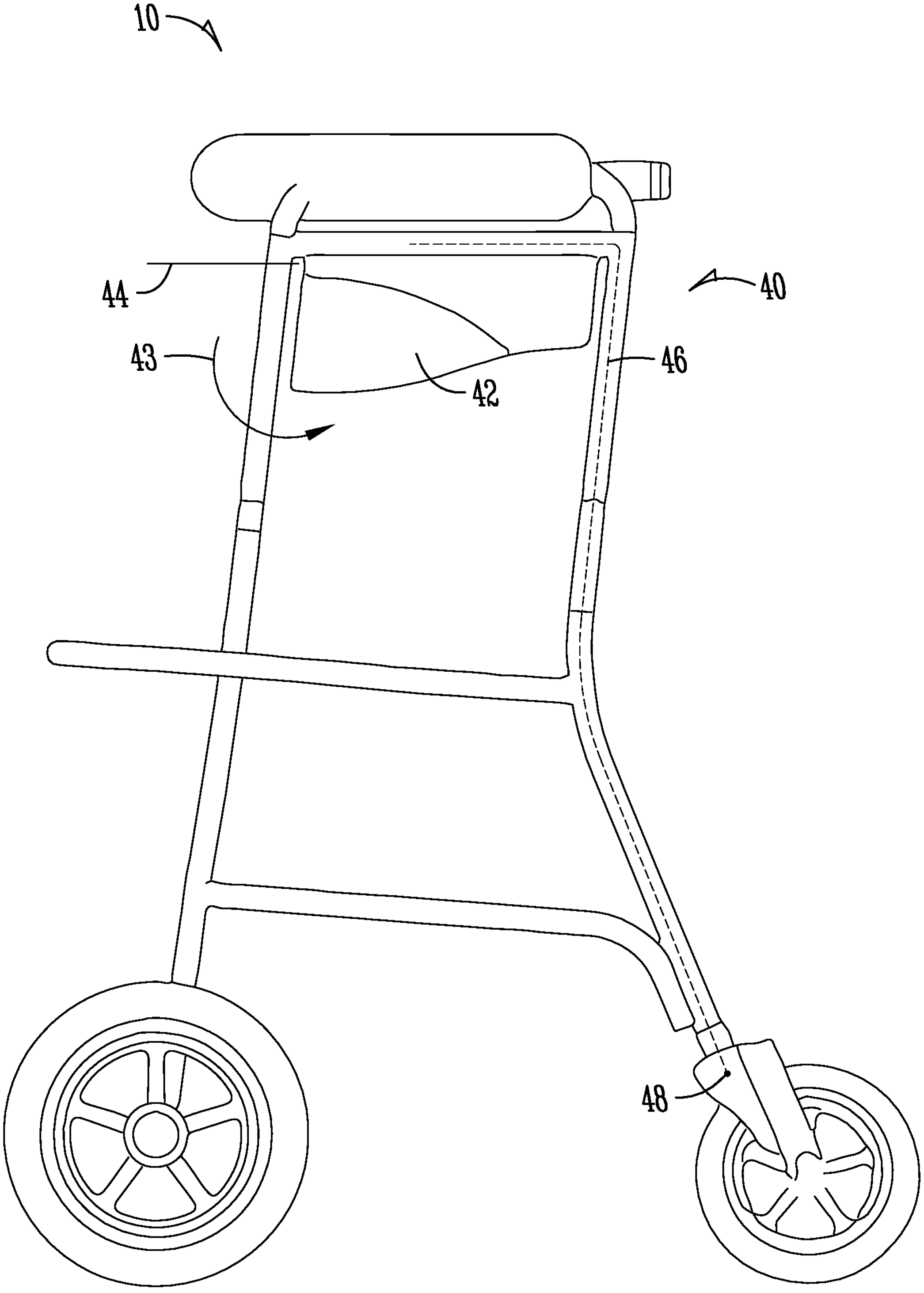
FIG. 21 is a side schematic of a braking system for use with a walking device according to aspects of the invention.
Figure 22:
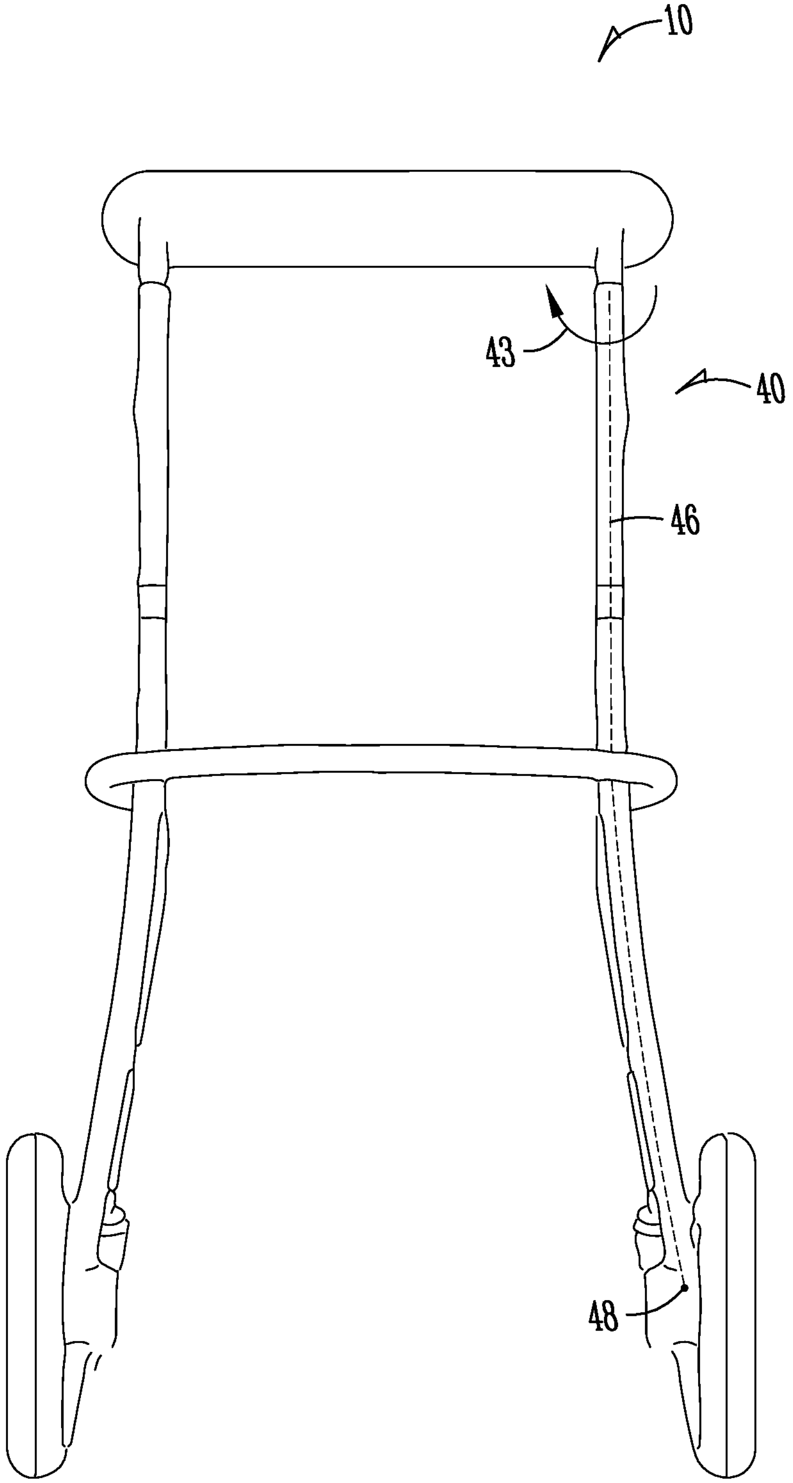
FIG. 22 is front schematic of the braking system.

Still additional aspects of the walking device 10 are shown best in FIGS. 21 and 22. A braking system 40 is shown in the figures and provide a system to give a user the ability to slow down or even stop momentum of the device 10. As will be appreciated, the braking system is configured to be used without the need of fine motion or hand dexterity, giving a much bigger range of use to a wider range of users and abilities.

The braking system 40 includes one or more paddles 42, which are rotatably connected to a portion of the frame 12, such as the crossbar under the support member 14 at the upper portion 16 of the frame 12. While the figures show two paddles on opposite sides of the frame, it should be appreciated that only paddle may be used with the device. The paddle(s) 42 is connected to provide rotatable movement that is generally perpendicular to the direction of travel of the device. For example, as shown in FIGS. 21 and 22, the arrow 43 shows that the paddle 42 would rotate in a direction that would be into the drawing, which is also towards the interior of the frame opening where the user is positioned. This is shown to about the axis 44, as shown in FIG. 21. When two paddles 42 are used, both would rotate towards each other in an inward manner for operation.

The paddles 42 are sized and designed to be operable with an upper extremity of a user, such as an inner arm. This could be the inner bicep of a user, who would move their arms towards their bodies to operate the paddles 42. Connected to the one or more paddles 42 is a cable or other activation member 46. The activation member 46 could take the form of a cable, rope, chord, or other linkage or connecting member, which would connect a paddle 42 to a brake 48 at or near a wheel. In the figures shown, the brake 48 is connected to the rear wheels 29 and is in the form of a friction brake to apply a pressure on the wheel(s) to slow down and/or stop the movement of the device 10. However, it should be appreciated that the brake could be positioned at the front wheel or could be at both the front and rear wheels. It should be appreciated that the natural motion of the paddles activating the internal cable 46, which pulls on the cable 46 to activate a brake mechanism at the rear wheel 29.

The brake 48 at the wheel could be a rim brake, disc brake, or drum brake. Rim brakes are so called because braking force is applied by friction pads to the rim of the rotating wheel, thus slowing it and the device 10. Brake pads can be made of leather, rubber or cork and are often mounted in metal "shoes".

The disc brake consists of a metal disc, or "rotor", attached to the wheel hub that rotates with the wheel. Calipers are attached to the frame or fork along with pads that squeeze the rotors for braking. As the pads drag against the rotor, the wheel—and thus the device 10—is slowed as kinetic energy (motion) is transformed into thermal energy (heat). Disc brakes may be actuated mechanically by cable, or hydraulically.

Drum brakes operate like those of a car, although the one used with the device 10 of the present disclosure would use cable rather than hydraulic actuation. Two pads are pressed outward against the braking surface on the inside of the hub shell.

Still additional types of brakes could be utilized with the paddle 42 and activation cable 46 of the braking system 40 according to aspects and/or embodiments of the invention, and it should be appreciated that the invention should not be limited to any particular or specific type of brake.

Figure 23:
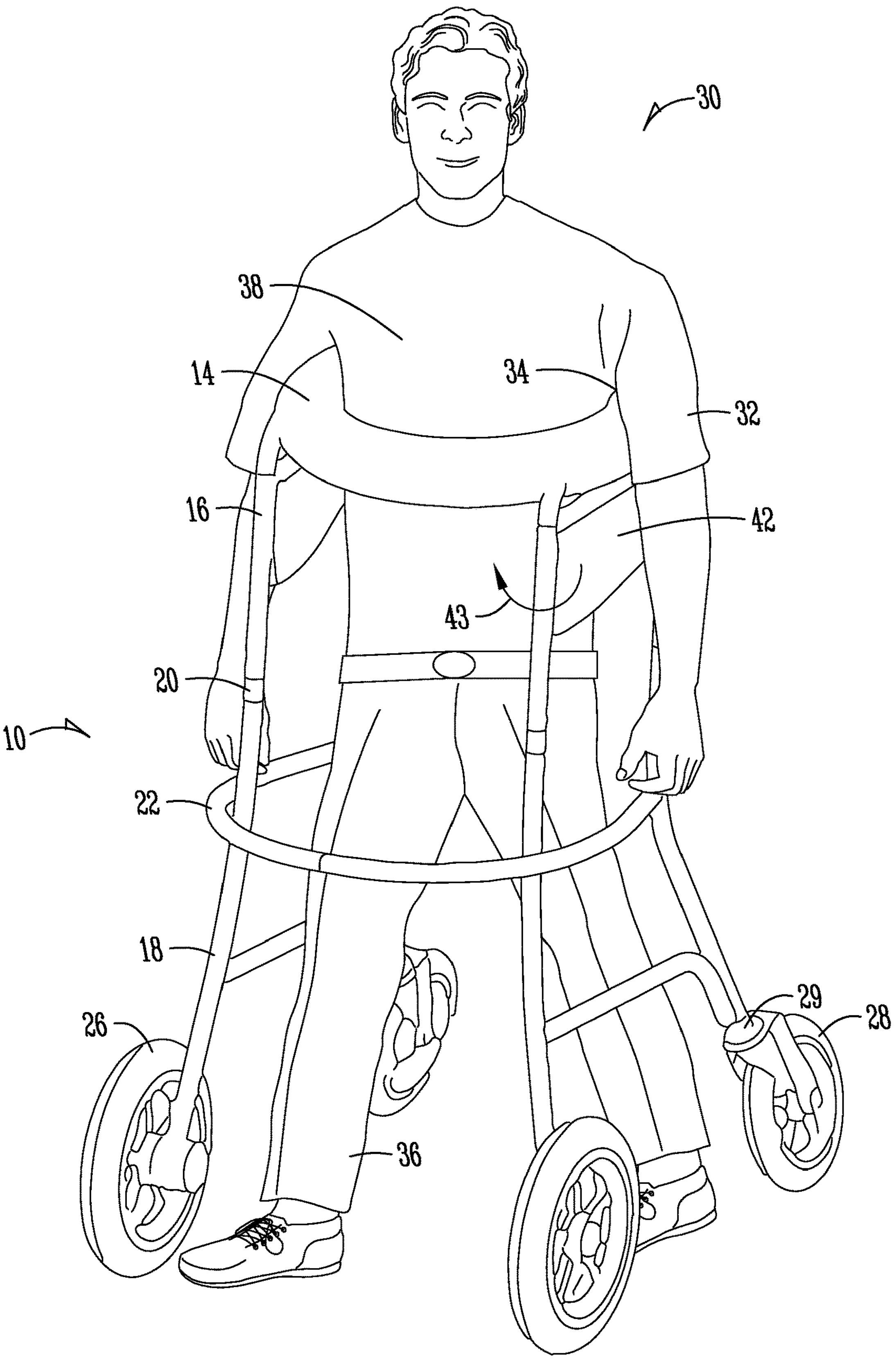
FIG. 23 is a depiction of a user using the walking device.

FIG. 23 is a depiction showing a person 30 using a walking device 10 as has been disclosed herein. It should be appreciated that the user is included for exemplary purposes, and the size, ability, and any other aspect of the user could vary greatly from that shown. The figure is included to show one example as to how the device 10 could be used by a user. As disclosed herein, the device 10 is height adjustable. It is envisioned that the height adjustability is configured to handle users of various heights. As shown, the support member 14 of the device can be used to support a portion of the upper body portion of the user 30. In the figure shown (FIG. 23), the support member 14 supports the user's upper extremities 32, such as at the armpits 34 of the user 30. A front portion of the support 14 is positioned at or near the chest or torso 38 of the user 30. This configuration would support the user 30 and also take pressure and weight off of the legs 36 of the user 30.

Supporting the user 30 at an upper extremity allows the user to comfortably and confidently move, such as for simple mobility of getting around for day-to-day activities, or even for exercise purposes. The wheels 26, 28 provide easier movement of the device to further aid in the movement and/or mobility of the user 30 via the device 10. For example, the rear wheels 28 are rotatable to some degree to provide further assistance to allow for turning and maneuverability of the device 10.

Still further, FIG. 23 shows a depiction of the use of the braking system 40 by the user 30. As shown, an upper extremity 32, such as an arm, is used to apply a pressure via the arrow 43. This activates a cable, chord, of the like, which activates a friction brake at one or more of the rear wheels 28.

From the foregoing, it can be seen that the present invention accomplishes at least all of the stated objectives. For example, the device 10 as shown and described will provide improved stability and ability to aid in the movement and mobility of a user who may have limited abilities. As disclosed, while certain features and advantages have been described, it should be appreciated that the invention should cover any combination of any features, embodiments, and/or aspects disclosed, and which would be obvious to those skilled in the art upon a reading of the present disclosure.

The invention claimed is:

1. A walking device, comprising:

a height adjustable frame comprising an upper frame portion comprising vertical members, a lower frame portion comprising members angled outwardly and obliquely from the upper frame portion such that the lower frame portion is wider and deeper than the upper frame portion, and a bottom portion comprising members extending vertically downwardly from the lower portion;

an upper body support at an upper end of the frame for retaining an upper body of a user, wherein the upper body support comprises one or more padded members on a portion of the upper end of the frame;

a plurality of wheels at the bottom portion of the frame, at least one of the plurality of wheels rotatably connected to the frame to allow swiveling thereof; and a braking system connected to the frame and the plurality of wheels, the braking system capable of slowing down and/or stopping the movement of one or more of the plurality of wheels.

2. The walking device of claim 1, further comprising a securing member connected to the upper frame portion to support and secure a user in the walking device.

3. The walking device of claim 1, wherein the upper frame portion comprises:

a. a pair of front, vertical frame members; and b. a pair of rear, vertical frame members; and wherein each of the front and rear pairs of vertical frame members comprise inner and outer telescoping members.

4. The walking device of claim 3, wherein the upper frame portion further comprises at least one crossbar connecting the pair of front, vertical members.

5. The walking device of claim 4, wherein the at least one crossbar and the pair of front, vertical members are selectively foldable to one another via at least one mechanical fastener.

6. The walking device of claim 3, wherein the pair of rear, vertical frame members comprise apertures and a spring steel button pin corresponding with the apertures.

7. The walking device of claim 1, wherein the lower frame further comprises a plurality of crossbars extending between a front and a rear of the device.

8. The walking device of claim 1, wherein the braking system comprises a hand brake at an upper portion of the frame and a friction brake at a wheel of the device.

9. The walking device of claim 8, further comprising a brake line connecting the hand brake to the friction brake.

10. A walking device, comprising:

a height adjustable frame comprising an upper portion comprising vertical members, a lower portion comprising members angled outwardly and obliquely from the upper frame portion such that the lower frame portion is wider and deeper than the upper frame portion, and a bottom portion comprising members extending vertically downward from the lower portion;

a plurality of comfort members at the upper portion to engage an upper extremity of a user;

a set of front wheels at a lower, front portion of the bottom portion of the height adjustable frame;

a set of rear wheels at a lower, rear portion of the bottom portion of the height adjustable frame, the set of rear wheels rotatable about a generally vertical axis to allow swiveling movement of the wheels relative to the height adjustable frame; and a hands-free braking system operatively connected to the set of rear wheels, said hands free braking system comprising a hands-free activation.

11. The walking device of claim 10, wherein the braking system comprises one or more paddles at an upper portion of the frame and engageable with one or more upper extremities of the user.

12. The walking device of claim 11, wherein the one or more paddles connected to the set of rear wheels via a cable to active a friction element in contact with the set of rear wheels to slow down and stop the wheels when activated.

13. The walking device of claim 10, further comprising a securing device adjacent the comfort member to secure a user to the height adjustable frame.

14. The walking device of claim 10, wherein the plurality of comfort members comprise padding members.

15. The walking device of claim 14, wherein the upper frame portion comprises:

a. a pair of front, vertical frame members; and b. a pair of rear, vertical frame members; and wherein each of the front and rear pairs of vertical frame members comprise inner and outer telescoping members.

16. The walking device of claim 15, wherein the upper frame portion further comprises at least one crossbar connecting the pair of front, vertical members.

17. The walking device of claim 16, wherein the at least one crossbar and the pair of front, vertical members are selectively foldable to one another via at least one mechanical fastener.

18. A walking device, comprising:

a height adjustable frame comprising an upper frame portion comprising vertical members, a lower frame portion, said lower frame portion comprising members angled outwardly and obliquely from the upper frame portion such that the lower frame portion is wider and deeper than the upper frame portion, and a bottom portion comprising members extending vertically downward from the lower portion;

wherein of the upper frame portions comprising a pair of front, vertical frame members and a pair of rear, vertical frame members, wherein each of the front and rear pairs of vertical frame members comprise inner and outer telescoping members, and, wherein the pair of rear, vertical frame members comprise apertures and a spring steel button pin corresponding with the apertures;

an upper body support at an upper end of the frame for retaining an upper body of a user, said upper body support comprising a padded member on the upper portion of the frame;

a plurality of wheels at the lower end of the frame, at least one of the plurality of wheels rotatably connected to the frame to allow swiveling thereof; and a braking system connected to the frame and the plurality of wheels, the braking system capable of slowing down and/or stopping the movement of one or more of the plurality of wheels.

19. The walking device of claim 18, wherein the frame portions are rotatable relative to one another about a generally vertical axis to move between a folded and unfolded configuration for the walking device.

* * * * *